US008868243B2

(12) United States Patent
Kim et al.

(10) Patent No.: US 8,868,243 B2
(45) Date of Patent: Oct. 21, 2014

(54) DRYING MACHINE AND METHOD FOR CONTROLLING THE SAME

(75) Inventors: Hyun Sook Kim, Hwaseong-si (KR); Eun Suk Bang, Hwaseong-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 404 days.

(21) Appl. No.: 13/173,747

(22) Filed: Jun. 30, 2011

(65) Prior Publication Data

US 2012/0197441 A1 Aug. 2, 2012

(30) Foreign Application Priority Data

Jan. 31, 2011 (KR) ........................ 10-2011-0009828

(51) Int. Cl.
*G05B 13/00* (2006.01)
*G05D 23/00* (2006.01)
*G05B 15/02* (2006.01)
*D06F 58/28* (2006.01)

(52) U.S. Cl.
CPC ........ *G05B 15/02* (2013.01); *D06F 2058/2896* (2013.01); *Y04S 20/227* (2013.01); *G05B 2219/2639* (2013.01); *G05B 2219/2642* (2013.01); *D06F 58/28* (2013.01); *Y02B 70/3241* (2013.01); *D06F 2058/2854* (2013.01)
USPC ....................................................... 700/275

(58) Field of Classification Search
CPC ............ G05B 2219/2639; D06F 58/28; D06F 2058/2896
USPC ....................................................... 700/275
See application file for complete search history.

(56) References Cited

U.S. PATENT DOCUMENTS

| 7,127,832 | B2 * | 10/2006 | Park et al. ........................ 34/562 |
| 8,355,826 | B2 * | 1/2013 | Watson et al. ................ 700/291 |
| 2004/0068889 | A1 * | 4/2004 | Park et al. ........................ 34/446 |
| 2005/0016012 | A1 * | 1/2005 | Yang et al. ...................... 34/486 |
| 2007/0129851 | A1 * | 6/2007 | Rossi et al. .................... 700/295 |
| 2009/0049709 | A1 * | 2/2009 | Doh ................................. 34/524 |
| 2010/0070099 | A1 * | 3/2010 | Watson et al. ................ 700/295 |
| 2010/0174668 | A1 * | 7/2010 | Finch et al. .................... 705/412 |
| 2012/0192450 | A1 * | 8/2012 | Kim et al. ........................ 34/427 |
| 2012/0271475 | A1 * | 10/2012 | Wang et al. .................... 700/295 |

\* cited by examiner

*Primary Examiner* — Mohammad Ali
*Assistant Examiner* — Sivalingam Sivanesan
(74) *Attorney, Agent, or Firm* — Staas & Halsey LLP

(57) ABSTRACT

A method for controlling a drying machine which includes a drum, a fan to circulate air within the drum, and at least one heater to heat air provided to the drum, and uses the motor and the at least one heater as a load, includes, upon receiving a drying process command from a user, receiving power rate information for each hour from an energy management system (EMS), recognizing current power rates on the basis of the power rate information for each hour, determining whether the current power rates are higher than reference power rates by comparing the current power rates with the reference power rates, and adjusting the operation rate of any one of the motor and the at least one heater when the current power rates are higher than the reference power rates. The drying machine changes the load operation rate before the power rates exceed the reference power rates, resulting in reduction in power consumption. Furthermore, as the drying machine can prevent total power consumption from being rapidly increased, the power plant need not be additionally driven to generate more electricity. As a result, the drying machine reduces environmental impact and prevents power rates from being increased.

33 Claims, 14 Drawing Sheets

DRYING MACHINE AND METHOD FOR CONTROLLING THE SAME

CROSS-REFERENCE TO RELATED APPLICATIONS

This application claims the priority benefit of Korean Patent Application No. 2011-0009828, filed on Jan. 31, 2011 in the Korean Intellectual Property Office, the disclosure of which is incorporated herein by reference.

BACKGROUND

1. Field

Embodiments relate to a drying machine for adjusting/controlling load driving to achieve power saving.

2. Description of the Related Art

With the development of Information Technology (IT), the number of household appliances powered by electricity is rapidly increasing, in turn leading to increasing power demand and consumption. In order to satisfy such increased power demand, the number of power plants is rapidly increasing. However, as can be seen from a power demand pattern, peak capacity is not reached during most days of the year. Therefore, power plants only operate at full capacity during a few days out of the year.

A state in which a high power demand is required for a short time is called peak load. Construction costs for adding an additional power plant to the grid are extremely high and maintenance costs for power plants constructed to maintain peak load for a short period are considerable.

Recently, numerous developers are conducting intensive research into a demand management method for temporarily restricting power consumption by limiting peak load without constructing such additional power plants. For the aforementioned purposes, demand management is a focus of attention, and a great deal of research is focused upon an advanced demand management format for demand response (DR).

DR is a system for intelligently managing energy consumption depending upon variation in power rates. For example, the consumer may temporarily stop an air-conditioner so as to reduce power consumption when power rates are high.

By the DR system, a power-supply source can alter end user power consumption to achieve load balancing and can restrict end user power consumption to periods when demand is low, thereby reducing the user's overall energy expenditure.

Therefore, a smart electric device to which demand response (DR) is applied has been developed, and an energy management system (EMS) for controlling the driving of the smart electric device has been developed. That is, the EMS informs the user of power rate information, and is turned on or off in response to the power rate information.

Accordingly, it is impossible to obtain the result at a user desired time. Specifically, the drying machine, or dryer, heats air and dries laundry using the heated air. The drying machine has high instantaneous power and high power consumption. That is, if power rates are high, it is very important to control the driving of the dryer.

Upon receiving power rate information from the power supply source, the drying machine is turned on or off on the basis of the received power rate information.

As a result, the drying machine stops operation during a time zone of high power rates and is driven during a time zone of low power rates. In this case, electricity bills can be reduced, but it is impossible for a user to obtain dried laundry at a desired time.

In addition, when the drying machine is driven in the time zone of high power rates, the operation states of all constituent elements are simultaneously deteriorated and the drying machine dries laundry, it is difficult to satisfy a user-desired degree of laundry dryness.

SUMMARY

Therefore, it is an aspect to provide a drying machine and a method for controlling the same, which change a dry cycle before power rate information is identical to or higher than reference power rate information under the condition that the power rate information is higher than the reference power rate information, and a method for controlling the same.

It is another aspect to provide a drying machine for adjusting an operation rate of load in response to the increasing power rates when a dry cycle is changed, and a method for controlling the same.

It is another aspect to provide a drying machine which divides a dry period into a heating drying period and a non-heating drying period and adjusts an operation rate of load of the highest power consumption, and a method for controlling the same.

Additional aspects of the invention will be set forth in part in the description which follows and, in part, will be obvious from the description, or may be learned by practice of the invention.

In accordance with one aspect, a drying machine includes a drum including an object to be dried; a fan to circulate air within the drum; a load which includes a motor to rotate the drum and the fan and a heater to heat air provided to the drum; a communication unit to receive power rate information for each hour from an energy management system (EMS); an input unit to receive a drying process command from a user; and a controller, upon receiving the drying process command, to recognize current power rates on the basis of power rate information for each hour, determine whether the current power rates are higher than reference power rates by comparing the current power rates with the reference power rates, and control the operation rate of any one of the motor and a heater when the current power rates are higher than the reference power rates.

The drying machine may further include a storage unit to store power consumption of the motor and power consumption of the heater, wherein the controller recognizes a current drying section from among several drying sections, recognizes one load having highest power consumption from among several loads operated in the current drying section, and adjusts an operation rate of the recognized load.

The drying machine may further include a storage unit to store an operation rate corresponding to power rates, wherein the controller divides the drying process into a plurality of drying sections, determines which load has highest power consumption from among the plurality of loads operated in the plurality of drying sections, and controls the determined load to be operated at an operation rate corresponding to the current power rates.

The controller determines whether power rates are changed in the drying process on the basis of the power rate information for each hour, recognizes the next power rates when the power rates are changed in the drying process, determines whether the next power rates are higher than the reference power rates by comparing the next power rates with the reference power rates, and adjusts the operation rate of either the motor or the heater from a power-rate change time when the next power rates are higher than the reference power rates.

The controller adjusts the operation rate of either the motor or the heater from a specific time earlier than the power-rate change time by a predetermined time.

The input unit receives a power saving rate from the user, and the controller adjusts the operation rate of either the motor or the heater in response to the power saving rate.

The drying machine may further include a storage unit to store load operation rates for each drying section while the drying process is performed at a point less than the reference power rates, wherein the controller controls the operation rates of the motor and the heater on the basis of the operation rate stored in the storage unit when the current power rates are less than the reference power rates.

The drying section includes a high temperature drying section, a low temperature drying section, and a non-heating drying section.

In accordance with another aspect, a drying machine includes a drum including an object to be dried; a fan to circulate air within the drum; a load which includes a motor to rotate the drum and the fan and a plurality of heaters to heat air provided to the drum; a communication unit to receive power rate information for each hour from an energy management system (EMS); an input unit to receive a drying process command from a user; and a controller, upon receiving the drying process command, to recognize current power rates on the basis of power rate information for each hour, determine whether the current power rates are higher than reference power rates by comparing the current power rates with the reference power rates, and adjust the operation rate of any one of the motor and the heaters when the current power rates are higher than the reference power rates.

The drying machine may further include a storage unit to store power consumption of the motor and power consumption of the heaters, wherein the controller recognizes a current drying section from among several drying sections, recognizes one load having highest power consumption from among several loads operated in the current drying section, and adjusts an operation rate of the recognized load.

The plurality of heaters includes a first heater and a second heater having different electric capacities.

The controller determines whether power rates are changed in the drying process on the basis of the power rate information for each hour, recognizes the next power rates when the power rates are changed in the drying process, determines whether the next power rates are higher than the reference power rates by comparing the next power rates with the reference power rates, and adjusts the operation rate of any one of the motor, first and second heaters from a power-rate change time when the next power rates are higher than the reference power rates.

The drying machine may further include a storage unit to store load operation rates for each drying section while the drying process is performed at a point less than the reference power rates, wherein the controller controls the operation rates of the motor and the heater on the basis of the operation rate stored in the storage unit when the current power rates are less than the reference power rates.

The drying section includes a high temperature drying section for operating the first and second heaters, a low temperature drying section for operating the second heater, and a non-heating drying section in which the first and second heaters are not operated.

In accordance with another aspect, a drying machine includes a drum including an object to be dried; a fan to circulate air within the drum; a load which includes a first motor to rotate the drum, a second motor to rotate the fan, and at least one heater to heat air provided to the drum; a communication unit to receive power rate information for each hour from an energy management system (EMS); an input unit to receive a drying process command from a user; and a controller, upon receiving the drying process command, to recognize current power rates on the basis of power rate information for each hour, determine whether the current power rates are higher than reference power rates by comparing the current power rates with the reference power rates, and adjust the operation rate of any one of the first motor, the second motor and the at least one heater when the current power rates are higher than the reference power rates.

The drying machine may further include a storage unit to store power consumption of each of the first and second motors and power consumption of the at least one heater, wherein the controller recognizes a current drying section from among several drying sections, recognizes one load having highest power consumption from among several loads operated in the current drying section, and adjusts an operation rate of the recognized load.

The controller determines whether power rates are changed in the drying process on the basis of the power rate information for each hour, recognizes the next power rates when the power rates are changed in the drying process, determines whether the next power rates are higher than the reference power rates by comparing the next power rates with the reference power rates, and adjusts the operation rate of any one of the first and second motors and the at least one heater from a power-rate change time when the next power rates are higher than the reference power rates.

The drying machine may further include a storage unit to store power consumption of the first and second motors and power consumption of the at least one heater, wherein the controller recognizes a drying section to be activated at the power-rate change time, recognizes one load having highest power consumption from among several loads operated in the recognized drying section, and adjusts an operation rate of the recognized load.

The drying machine may further include a storage unit to store load operation rates for each drying section while the drying process is performed at a point less than the reference power rates, wherein the controller controls the operation rates of the motor and the heater on the basis of the operation rate stored in the storage unit when the current power rates are less than the reference power rates.

Upon receiving a drying process command from the energy management system (EMS) through the communication unit, to controller adjusts the operation rates of the first motor, the second motor, and at least one heater on the basis of the received dry process command.

In accordance with another aspect, a method for controlling a drying machine which includes a drum, a fan for circulating air within the drum, and at least one heater to heat air provided to the drum, and uses the motor and the at least one heater as a load includes, upon receiving a drying process command from a user, receiving power rate information for each hour from an energy management system (EMS); recognizing current power rates on the basis of the power rate information for each hour; determining whether the current power rates are higher than reference power rates by comparing the current power rates with the reference power rates; and adjusting the operation rate of any one of the motor and the at least one heater when the current power rates are higher than the reference power rates.

The adjusting the operation rate of any one of the motor and the at least one heater may include recognizing a plurality of drying sections contained in the drying process; recognizing a load to be operated in the plurality of drying sections; recognizing each load having highest power consumption from among several loads to be operated in the plurality of drying sections; and adjusting the operation rate of each load having the highest power consumption from among the plurality of drying sections.

The adjusting the operation rate of each load having the highest power consumption from among the plurality of drying sections may include allowing the load to be operated at an operation rate corresponding to the current power rates.

The method may further include controlling operation rates of the motor and the at least one heater on the basis of a predetermined operation rate when the current power rates are less than the reference power rates.

The method may further include recognizing an execution time of the drying process; determining whether power rates are changed in the drying process execution time on the basis of power rate information for each hour; if the power rates are changed in the drying process execution time, recognizing the next power rates and a power-rate change time; and comparing the next power rates with reference power rates to determine whether the next power rates are higher than the reference power rates, and adjusting an operation rate of the motor and at least one heater from the power-rate change time when the next power rates are higher than the reference power rates.

The adjusting the operation rate of any one of the motor and the heater may include recognizing a drying section to be activated at the power-rate change time; recognizing a load having highest power consumption from among several loads operated in the recognized drying section; and adjusting an operation rate of the recognized load.

The method may further include, if the next power rates are equal to or less than the reference power rates, allowing each of the motor and the at least one heater to be operated at a predetermined operation rate from the power-rate change time.

The adjusting the operation rate of the motor and the heater from the power-rate change time may include adjusting the operation rate of any one of the motor and the at least one heater from a specific time earlier than the power-rate change time by a predetermined time.

In accordance with another aspect, a method for controlling a drying machine which includes a drum, a fan to circulate air within the drum, a first motor to rotate the drum, a second motor to rotate the fan, and at least one heater to heat air provided to the drum, and uses the first and second motors and the at least one heater as a load includes upon receiving a drying process command from a user, recognizing a drying process execution time; receiving power rate information for each hour from an energy management system (EMS); recognizing current power rates on the basis of the power rate information for each hour; determining whether the current power rates are higher than reference power rates by comparing the current power rates with the reference power rates; and adjusting the operation rate of any one of the first and second motors and the at least one heater when the current power rates are higher than the reference power rates.

The adjusting the operation rate of any one of the first and second motors and at least one heater may include recognizing a plurality of drying sections contained in the drying process; recognizing a load to be operated in the plurality of drying sections; recognizing each load having highest power consumption from among several loads to be operated in the plurality of drying sections; and adjusting the operation rate of each load having the highest power consumption from among the plurality of drying sections.

The adjusting the operation rate of each load having the highest power consumption from among the plurality of drying sections may include allowing the load to be operated at an operation rate corresponding to the current power rates.

The method may further include controlling operation rates of the motor and the heater on the basis of a predetermined operation rate when the current power rates are less than the reference power rates.

The method may further include recognizing an execution time of the drying process; determining whether power rates are changed in the drying process execution time on the basis of power rate information for each hour; if the power rates are changed in the drying process execution time, recognizing the next power rates and a power-rate change time; and comparing the next power rates with reference power rates to determine whether the next power rates are higher than the reference power rates, and adjusting an operation rate of the motor and the heater from the power-rate change time when the next power rates are higher than the reference power rates.

The adjusting the operation rate of any one of the motor and the heater may include recognizing a drying section to be activated at the power-rate change time; recognizing a load having highest power consumption from among several loads operated in the recognized drying section; and adjusting an operation rate of the recognized load.

The method may further include if the next power rates are equal to or less than the reference power rates, allowing each of the motor and the at least one heater to be operated at a predetermined operation rate from the power-rate change time.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
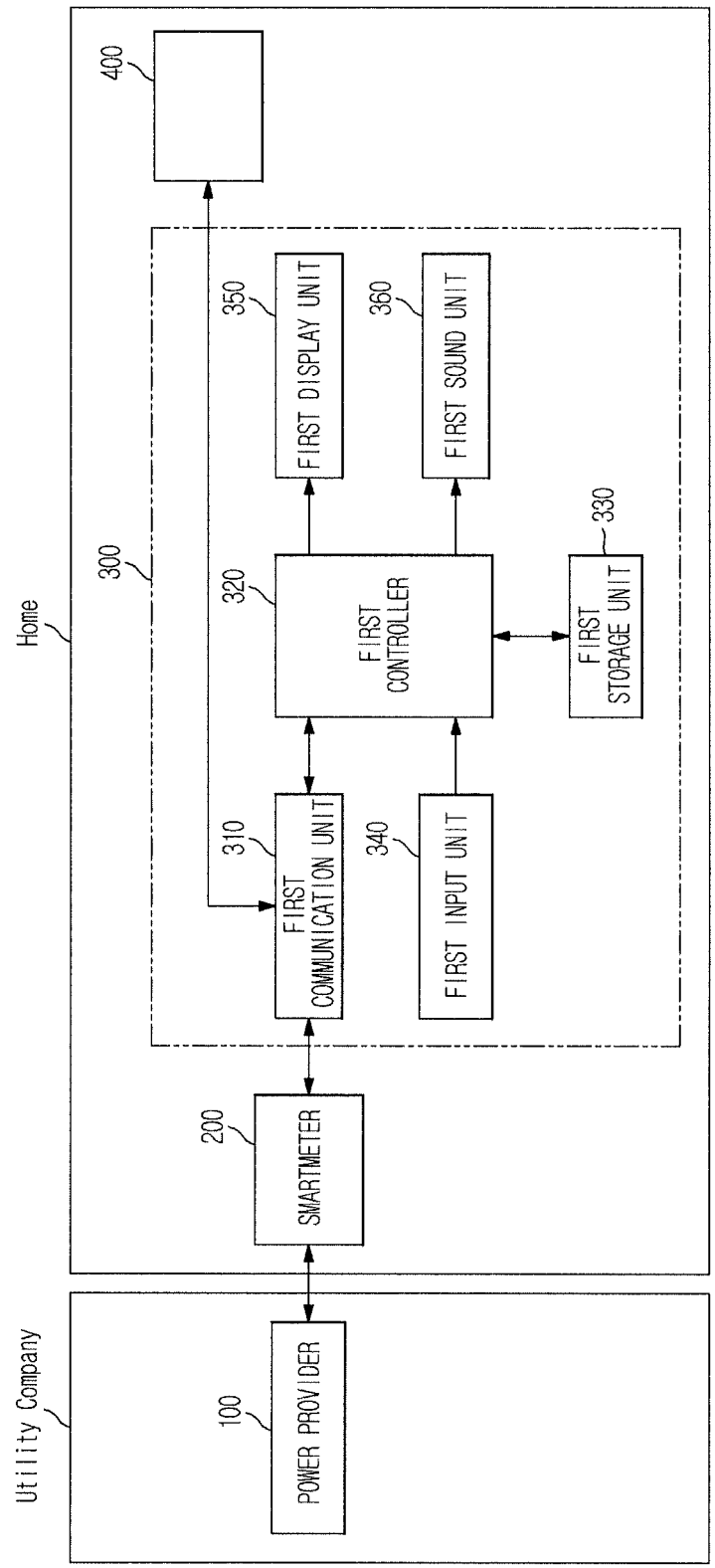
FIG. 1 is a configuration diagram illustrating a power management system including a drying machine according to an embodiment.

Reference will now be made in detail to example embodiments, examples of which are illustrated in the accompanying drawings, wherein like reference numerals refer to like elements throughout.

Figure 2:
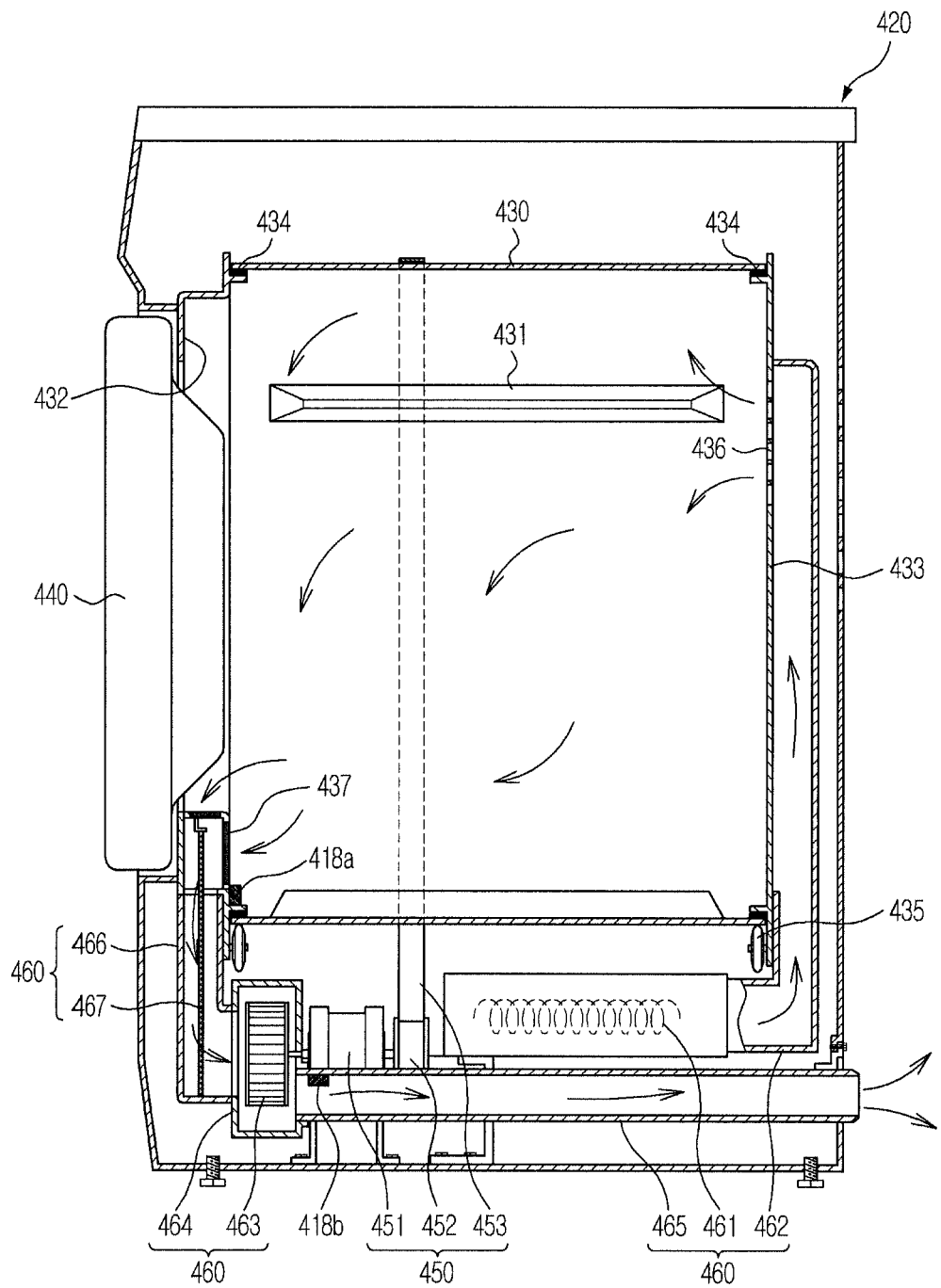
FIG. 2 is an exemplary structure of a drying machine according to one embodiment.
Figure 3:
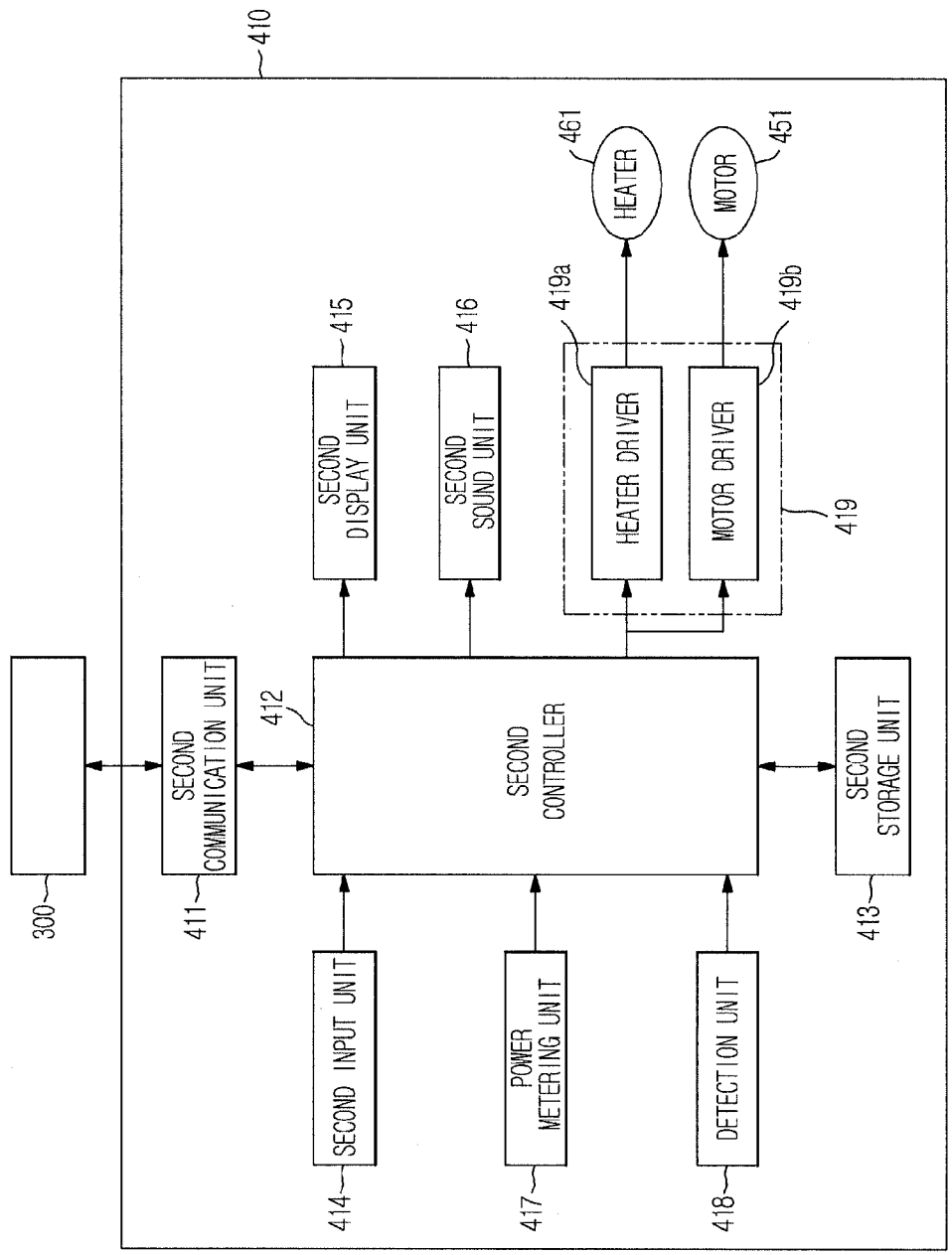
FIG. 3 is a block diagram illustrating a drying machine according to one embodiment.

FIG. 1 is a configuration diagram illustrating a power management system including a drying machine according to an embodiment. FIG. 2 is an exemplary structure of a drying machine according to one embodiment. FIG. 3 is a block diagram illustrating a drying machine according to one embodiment.

A power management system including an energy management system (EMS) communicating with a drying machine will hereinafter be described with reference to FIG. 1.

Referring to FIG. 1, a power management system includes a power provider 100, a smart meter 200, an energy management system (EMS) 300, and a drying machine (or dryer) 400.

The power provider 100 is a power supply source operated by a power supply company (utility company) which generates and supplies power. The power provider 100 generates the power through atomic energy, hydroelectric power, geothermal power, wind power, etc., and provides the generated power to electric devices 400 installed in homes.

The power provider 100 predicts power consumption on the basis of the generation amount of electric power, the past power consumption information for every season and every period, and weather information, and determines power rates on the basis of the predicted power consumption. In this case, it may also be possible to establish a power rate level corresponding to the predicted power rate as necessary.

The power provider 100 controls power rates of each home to be elastically adjusted in response to power consumption of each home, and provides the adjusted power to each home, such that demand can be balanced.

The power provider 100 collects power consumption amounts of individual homes classified according to individual power rates, and stores the collected power consumption information according to individual power rates, such that the power-supply company calculates power rates (electricity bills) depending upon power consumption for individual power rate levels of each home per month, and charges each home the calculated electricity bills on a monthly basis.

The power provider 100 compares the periodically calculated monthly power rate (monthly bills) with monthly predetermined power rates so as to calculate power bills. If the calculated monthly power rates exceed the monthly predetermined power rates, information about the excess of the monthly predetermined power rates is transmitted to the EMS 300 installed in the corresponding home, such that an event indicating the excess of monthly predetermined power rates is generated through the EMS 300 installed in each home.

The power provider 100 stores a threshold power amount for each home, compares power consumption amounts for each home with a threshold power amount, and thus decides a power limitation amount. In this way, the power provider 100 manages the power demand of each home on the basis of the threshold power amount or the monthly predetermined power rates.

The power provider 100 is connected to the smart meter 200 installed in each home, the EMS 300, and the drying machine 400 over a network, such that data regarding power demand management can be transmitted and received over the network. This network may be any of a wired network, a wireless network, a wired/wireless hybrid network, etc.

The smart meter 200 is installed in each home, and includes a display such as a liquid crystal display (LCD), such that power consumed in each home is displayed in real time. The smart meter 200 is an electronic meter, which bidirectionally communicates with the power provider 100 and transmits the consumed power amount to the power provider 100 and the EMS 300.

The smart meter 200 receives power rate information from the power provider 100, displays the received power rate information, and transmits the power rate information to the EMS 300.

In addition, the smart meter 200 may further display a price level corresponding to the power rate information upon receiving the power rate information from the power provider 100, and may also transmit the power rate and price level information to the EMS 300.

The EMS 300 may also be referred to as a Demand Response (DR) controller. The EMS 300 communicates with the smart meter 200, and thus receives power rate information and power rate level information from the smart meter 200.

The EMS 300 communicates with the drying machine 400 such that it receives power consumption information regarding the drying machine. In addition, the EMS 300 transmits power data to the drying machine 400, and controls the operation of the drying machine 400 on the basis of power consumption of the drying machine 400 and power rate level of the power provider 100.

The EMS 300 may also establish a power rate level on the basis of power rates upon receiving only the power rates from the power provider 100.

In this case, the EMS 300 receives power rate information of the power provider 100 through the smart meter 20 at intervals of a unit time, and establishes a power rate level for each power rate information using the received power rate information for each unit time.

In this case, the number of the power rate levels may be 4 (DR1 to DR4), and a plurality of levels may have different power rates. Assume that the number of power rate levels is 4 (DR1 to DR4). In more detail, the power rate level DR1 is the lowest power rate level, and the power rate level DR4 is the highest power rate level. Power rate level is proportional to power rate.

The EMS 300 receives information about excess monthly threshold power and information about excess monthly predetermined power rates from the power provider 100, and informs the user of the received information.

When the EMS 300 compares the predicted (or current) power amount for each hour with the allowed instantaneous power amount, if the predicted (or current) power amount for each hour is equal to or greater than the allowed instantaneous power amount, operation of the drying machine 400 is controlled and the controlled result is output so as to inform the user of the controlled result.

Referring to FIG. 1, the EMS 300 includes a first communication unit 310, a first controller 320, a first storage unit 330, a first input unit 340, a first display 350, and a first sound unit 360.

The first communication unit 310 receives power rate information from the smart meter 200 and power rate level information corresponding to the received power rate information from the smart meter 200 by communicating with the smart meter 200, and transmits the received information to the first controller 320.

The first communication unit 310 receives operation information from the electric device 400 by communicating with the drying machine 400, transmits the received information to the first controller 320, receives power rate information and an operation control signal of the drying machine 400 from the first controller 320, and transmits the received information to the drying machine 400.

In this case, the power rate information may be a previous day's officially fixed price received from the power provider 100 or may be a power rate received in real time from the power provider 100.

When transmitting power rate information to the drying machine 400, power rate information for each hour and power rate level information for each hour may be transmitted.

Upon receiving the previous day's officially fixed price, the first controller 320 confirms a time at which power rates are to be changed and a power rate value to be changed on the basis of the received previous day's officially fixed price.

In addition, if the first controller 320 receives power rate information in real time, it may predict a future power rate for each hour using a pre-stored past power consumption pattern, and confirm a time at which power rates are to be changed and a power rate level to be changed on the basis of the predicted future power rate for each hour.

The first controller 320 controls the first display 350 and the first sound unit 360, such that it informs the user of both a time at which power rates are to be changed and a power rate value to be changed, and transmits a current power rate, a time at which the power rate is to be changed, and a power rate value to be changed to the drying machine 400.

In addition, the first controller 320 may calculate the operation rate of the drying machine 400 on the basis of a current power rate, a time at which a power rate is changed, power rate data to be changed, and transmit the calculated operation rate to the drying machine 400.

In this case, the first controller 320 calculates the operation rate of one load having the highest power consumption from among several loads contained in the drying machine 400, and calculates the operation rate corresponding to the increase rate of the power rates in such a manner that power consumption can be reduced in direct proportion to the increase rate of the power rates.

The first storage unit 330 stores user information. In this case, the user information may include the monthly threshold power amount, the monthly predetermined power rate, the allowed power for each hour, and user personal information.

In addition, the first storage unit 330 may store power consumption of several loads contained in the drying machine 400, and may store the load operation rate corresponding to the increase rate of the power rate.

The first input unit 340 receives user information, and transmits it to the first controller 320.

The first input unit 340 may receive a selection signal for adjusting the operation rate of the drying machine in response to variation of power rates.

In this case, if the user selects the selection signal for adjusting the operation rate of the drying machine in response to variation of power rates, the first input unit 340 may transmit this selection signal to the first controller 320. Accordingly, the first controller 320 may control the operation rate of the drying machine when the power rate is changed according to the user selection signal.

In addition, the first controller 320 may transmit the selection signal for adjusting the operation rate of the drying machine in response to the power rate variation received from the first input unit 340 to the drying machine 400.

The first input unit 340 may also receive the operation rate of the drying machine.

In this case, if the user inputs the operation rate of the drying machine, the first controller 320 controls the operation of the drying machine using the input operation rate of the drying machine. If total power consumption is close to the allowed power, it may also be possible to control the driving of other electric devices.

In addition, the first controller 320 may also transmit the drying machine operation rate received from the first input unit 340 to the drying machine 400.

The first display 350 may display either of the current power rate and the current power rate level, or may display either of the previous day's power rates for each hour and the previous days' power rate level.

The first display 350 displays not only a time at which power rates are to be changed, but also power rates to be changed.

The first display 350 displays the operation rate of the drying machine 400 while the drying machine 400 is driven, and displays operation rate adjustment information depending upon variation of the power rates.

The first input unit 340 and the first display 350 are integrated into one body, and may be configured in the form of a touchscreen.

The first sound unit 360 audibly outputs the operation rate information to be adjusted when the operation rate of the drying machine 400 is adjusted.

The first sound unit 360 audibly outputs a time at which the power rates are changed, and audibly outputs the power rates to be changed.

The first sound unit 360 audibly outputs information about the excess of the allowed power, information about the excess of the monthly threshold power, and information about the monthly predetermined electricity bills.

The drying machine 400 is connected to the EMS 300 by wire or wirelessly, receives either power rate information or an operation command transmitted from the EMS 300 by wire or wirelessly, is operated in response to the received power rate information or the operation command, and transmits, in real time, power consumption information for each operation mode to the EMS 300.

The structure of the drying machine 400 will hereinafter be described in detail.

Referring to FIG. 2, the drying machine 400 includes a control unit 410 for controlling a drying process, a main body 420 forming an external appearance, a drum 430 rotatably installed in the main body 420, a door 440 for opening or closing the drum, a driving assembly 450 to rotate the drum 430, and a drying assembly 460 for drying an object to be dried within the drum 430.

The main body 420 includes the control unit 410, and includes a variety of constituent components for drying an object to be dried. The control unit 410 includes a second input unit including a variety of buttons, a second display for displaying a variety of information, a second sound unit for audibly outputting a variety of information, a second controller for controlling the drying process, and a second storage unit for storing a variety of information.

The drum 430 is formed in a cylindrical shape, the front and back surfaces of which are open. The inner circumference of the drum 430 includes a plurality of lifters 431 to lift an object to be dried.

The front support plate 431 and the rear support plate 433 are installed in the opened front surface and the opened back surface of the drum 430, respectively.

That is, the opened front surface of the drum 430 is covered by the front support plate 432 fixed to the front side of the main body 420, and the opened rear surface of the drum 430 is covered by the rear support plate 433 fixed to the rear side of the main body 420.

In this case, the front support plate 432 and the rear support plate 433 support the drum 430 in such a manner that the drum 430 can rotate.

For this operation, each of a contact part between the front support plate 432 and the drum 430 and a contact part between the rear support plate 433 and the drum 430 includes a slip pad 434. A roller 435 for rotatably supporting the drum 430 is provided at a lower part of each of the front support plate 432 and the rear support plate 433. Accordingly, the drum 430 can smoothly rotate.

The rear support plate 433 provided at the back surface of the drum 430 includes a suction hole 436 for suctioning in hot air, and the lower part of the drum 430 includes a discharge hole 437 for discharging humid or moist air to the outside.

A humidity detection unit 418a for detecting humidity of the inner part of the drum 430 is provided in the vicinity of the inner discharge hole 437 of the drum 430.

The humidity detection unit 418a generates an electric signal corresponding to the amount of moisture contained in the drum 430 such that the level of dryness of the object can be determined.

The front surface of the main body 420 includes an injection hole through which an object to be dried is put in the drum 430 or is taken out of the drum 430, also includes a door 440 for opening or closing the injection hole.

The drive assembly 450 includes a motor 451 installed at a lower part of the inner part of the main body 420, a pulley 452 for receiving power from the motor 451 so as to be rotated, and a belt 453 to rotate the drum 430 simultaneously while being rotated by rotation of the pulley 452.

That is, the belt 453 is installed to be wound on the outer circumference of the pulley 452 and the outer circumference of the drum 430, such that the pulley 452 is rotated in response to the driving of the motor 451 and the drum 430 is also rotated.

The drying assembly 460 includes a heater 461 to heat air to be sucked into the drum, a suction duct 462 for directing air heated by the heater 461 to the inside of the drum 430, a fan 463 for ventilating high temperature and humidity air contained in the drum 430, a fan case 464 for accommodating the fan 463, a discharge duct 465 for discharging the air sucked by the fan 463 to the outside, a filter duct 466 provided between the fan 463 and the drum 430, and a filter 467 contained in the filter duct 466.

In this case, the fan 463 is rotated by the motor 451. That is, the axis of the motor 451 is extended to both sides, the pulley 452 is connected to one side of the axis of the motor 451, and the fan 463 is connected to the other side thereof.

The discharge duct 465 includes a temperature detector 418b for detecting a temperature (i.e., a discharge temperature) of the air discharged from the drum 430.

One side of the filter duct 466 is coupled to the inside of the drum 430, and the other side thereof is coupled to the fan case 464. The filter 467 is used to filter a variety of foreign materials such as dust or nap contained in the air discharged from the discharge hole 436. That is, foreign materials such as dust or nap contained in the air discharged from the discharge hole 436 can be filtered through the filter 467.

The control unit 410 for use in the drying machine 400 will hereinafter be described with reference to FIG. 3.

Referring to FIG. 3, the control unit 410 of the drying machine 400 includes a second communication unit 411, a second controller 412, a second storage unit 413, a second input unit 414, a second display 415, a second sound unit 416, a power measurement unit 417, a detection unit 418, and a load drive unit 419.

The second communication unit 411 communicates with the EMS 300, transmits operation information related to the drying process to the first communication unit 310 of the EMS 300 upon receiving a message from the second controller 412, and transmits an operation control signal received from the first communication unit 310 of the EMS 300 to the second controller 412.

The second communication unit 411 receives power rate information form the EMS 300. In this case, the power rate information includes at least one of power rates for each hour and a power rate level corresponding to power rates for each hour.

Upon receiving a command for starting the drying process, the second controller 412 determines a current power rate on the basis of power rates for each hour, and compares the current power rate with a reference power rate. If the current power rate is less than the reference power rate, the second controller 412 controls the operation rate of load with a predetermined operation rate. Otherwise, if the current power rate exceeds the reference power rate, the second controller 412 determines the increasing rate of the current power rate on the basis of the reference power rate, and controls the operation of load with an operation rate corresponding to the determined increasing rate.

The second controller 412 confirms whether there arises a variation in power rates during the drying process. If the variation in power rates has occurred in the drying process, the second controller 412 recognizes the next power rate to be changed, and compares the next power rate with the reference power rate. If the next power rate is less than the reference power rate, the operation rate of the load is controlled at a predetermined operation rate. Otherwise, if the next power rate is higher than the reference power rate, the second controller 412 determines the increasing rate of the next power rate on the basis of the reference power rate, and controls the load operation with the operation rate corresponding to the determined increasing rate.

In this case, the price increasing rate based on the reference power rate may correspond to a reduction ratio of power to be reduced by the user, and this power reduction rate may correspond to the operation rate of load to be adjusted by the drying machine.

The second controller 412 confirms at least one drying process in which the power rate is changed, and reduces the operation rate of the highest power consumption load within at least one of the confirmed drying processes.

In this case, the second controller 412 confirms a variation time in which the power rate is changed, and reduces the operation rate of the highest power consumption load from a specific time located ahead of a predetermined time T on the basis of the variation time.

The second controller 412 determines whether the power rates are additionally changed. If the power rates are additionally changed, the second controller 412 confirms an additional change time, and controls the load operation rate in response to the comparison result between the current power rate and the reference power rate during the additional change time.

The second controller 412 sums the maximum instantaneous power amounts of other electric devices to be driven at an operation start time of the drying machine 400 on the basis of information stored in the first storage unit 330, such that it predicts power consumption to be generated while the drying machine 400 is driven. The second controller 412 compares the predicted power consumption with the allowed power amount, such that it may also control the operation rate of the drying machine when the predicted power consumption exceeds the allowed power amount. In this case, the second controller 412 adjusts and controls the load operation rate in response to the excess of power greater than the allowed power.

The second controller 412 calculates humidity variation (i.e., variation in humidity changed at intervals of a predetermined time) on the basis of the drum 430's humidity detected by the humidity detection unit 418a, and divides the dry interval for use in a drying process into several drying sections according to the calculated humidity variation (i.e., the dry rate), such that it controls the operation rate of any one of several loads.

That is, the second controller 412 determines which load is operated in each drying section, and controls the operation rate of the highest power consumption load from among the determined loads.

In this case, the dry interval includes a heating drying section in which the air of the drum 430 is heated and a non-heating drying section in which the air of the drum 430 is not heated. The heating drying section includes a high-temperature drying section to heat the air provided to the drum 430 to high temperature, and a low-temperature drying section to heat the air provided to the drum 430 to low temperature.

In more detail, in the case of the high temperature drying section, the heater 461 is operated at an operation rate of 100%. In addition, during the high temperature drying section, if a predetermined time has elapsed, the motor 451 is maintained at the operation rate of 100% under the condition that the operation rate of the heater 461 is maintained at 100%, such that the drum 430 and its peripheral temperature quickly reach a target temperature. If the drum 430 reaches the target temperature, the drum 430 can be maintained at the target temperature during the high temperature drying section. In this case, moisture or humidity contained in an object to be dried can be removed within a short time.

In the case of the low temperature drying section, if humidity variation in the drum 430 is less than the reference humidity variation, the operation rate of the heater 461 is reduced such that the heater 461 is operated at a low operation rate. In addition, the operation rate of the motor 451 is maintained at 100%, such that the drum 430 is maintained at a low temperature.

During the low temperature drying section, as a temperature of the exhaust air is rapidly increased, the humidity contained in the drum 430 is rapidly reduced. In this case, an object to be dried has little humidity, such that it can be sufficiently dried even at a low temperature.

In the case of the non-heating drying section, the heater 461 stops operation (i.e., the operation rate of the heater is set to 0%), and the motor 451 is operated at the operation rate of 100%, such that the air contained in the drum is circulated. In this case, hot air contained in the drum 430 is discharged to the outside by a ventilation operation, such that a temperature of the drum 430 and a temperature of laundry contained in the drum 430 can be lowered.

That is, if power rates encountered during the drying process are equal to or less than reference power rates, the second controller 412 is controlled either at a predetermined (or pre-stored) operation rate of the motor 451 or at the operation rate of the heater 461.

In more detail, the second controller 412 enables each of the heater 461 and the motor 451 to be operated at the operation rate of 100% in such a manner that a high temperature drying mode is carried out. In the case of the high temperature drying mode, if humidity variation is less than a reference humidity variation, the heater 461 is operated at the operation rate of 50% and the motor 451 is operated at the operation rate of 100% in such a manner that a low temperature dry mode is carried out. If the low temperature drying time reaches a predetermined period of time, the heater 461 stops operation and the motor 451 is operated at the operation rate of 100% in such a manner that the non-heating dry mode is controlled.

In addition, during the low temperature dry control mode, the second controller 412 may also turn the heater 461 on or off in response to the exhaust air temperature detected by the temperature detection unit 418b.

The second storage unit 413 stores power rates for each hour and reference power rates for each hour.

The second storage unit 413 stores power consumption of the motor 451 and power consumption of the heater 461, and stores the operation rate of the heater 461 and the operation rate of the motor 451 in response to the increasing rate of power rates.

In this case, the power consumption of the motor 451 or the heater 461 may be maximum instantaneous power or average power consumption.

The second input unit 414 receives a drying process command from a user or receives information regarding a reservation time for the drying process from the user, and transmits the received command and information to the second controller 412.

The second input unit 414 may also directly receive the operation rate of load (at least one of the heater and the motor) from the user. In this case, the second controller 412 may control the load operation on the basis of the operation rate of load entered by the user.

If necessary, the second input unit 414 may receive an acknowledgement (ACK) signal for operation rate adjustment.

The second display 415 displays power rates for each hour or power rate levels for each hour.

The second display 415 displays a state of the drying process. Here, if the progress state of the drying process and the operation rate of the drying process are adjusted, the second display 415 displays a message related to load (heater or motor) corresponding to the adjusted operation rate.

The second input unit 414 and the second display 415 are integrated into one body, and may be configured in the form of a touchscreen.

The second sound unit 416 audibly outputs information indicating whether power rates are changed.

If the operation rate of any load is adjusted, the second sound unit 416 audibly outputs a message for adjusting the load operation rate upon receiving a message from the second controller 412.

The second sound unit 416 audibly outputs a message indicating the start of the drying process and a message indicating the end of the drying process.

The power management unit 417 measures power consumption of the drying machine in real time, and transmits the measured power consumption to the second controller 412, such that it can detect the actual power consumption of the drying machine 400 and can update information regarding power consumption stored in the second storage unit 413.

The power measurement unit 417 measures power using not only a voltage detected at both ends of the AC power line connected to a power connector (not shown) of the drying machine 400 but also a current detected by any one of AC power lines connected to the power connector.

The detection unit 418 includes a humidity detection unit 418a for detecting humidity contained in the drum 430, and a temperature detection unit 418b for detecting a temperature of the air discharged from the drum 430.

The load drive unit 419 includes a heater driver 419a for driving the heater 461 in response to a message of the second controller 412, and a motor driver 419b for driving the motor 451 in response to a message of the second controller 412.

Figure 4:
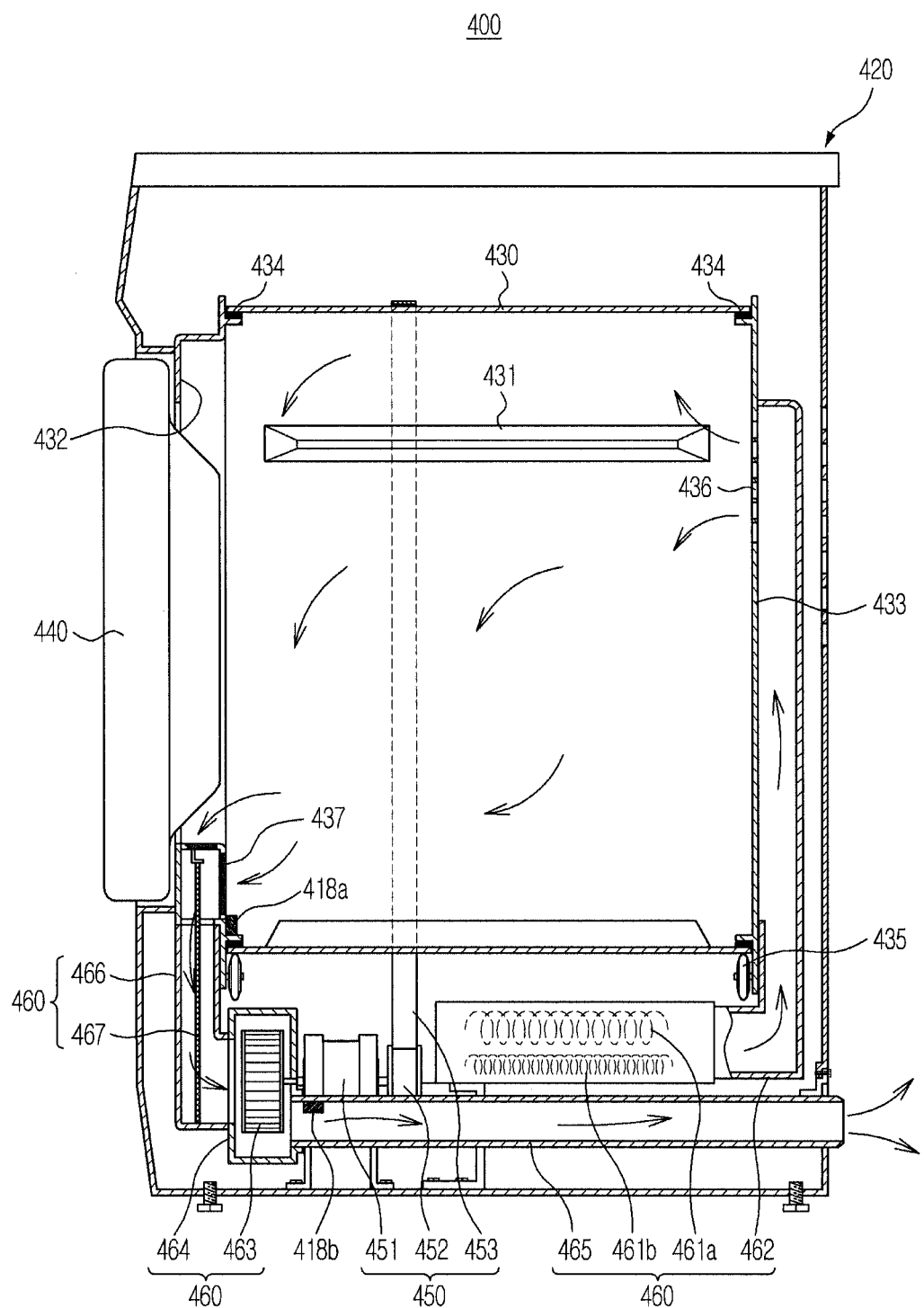
FIG. 4 is an exemplary structure of a drying machine according to another embodiment.
Figure 5:
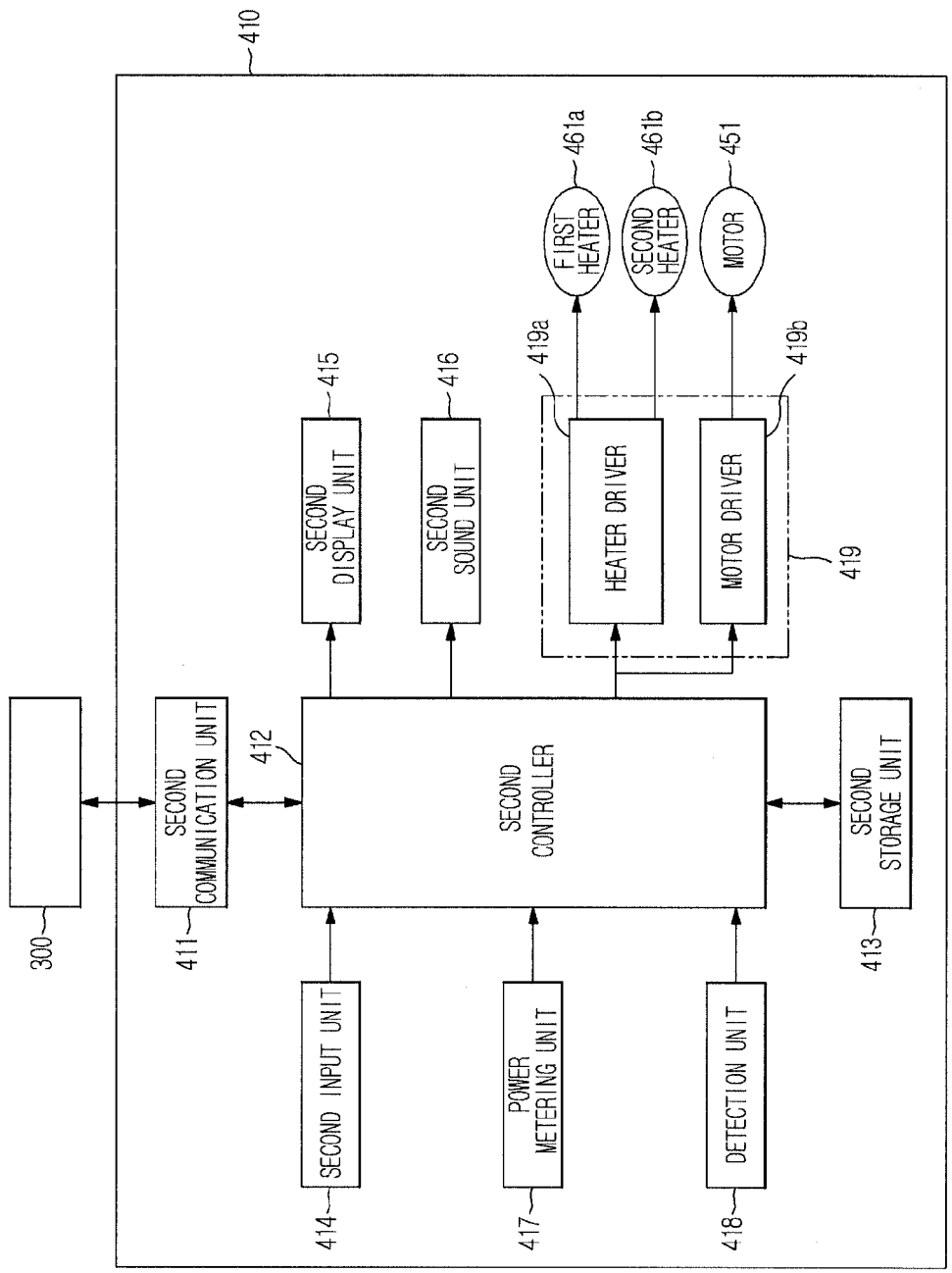
FIG. 5 is a block diagram illustrating a drying machine according to another embodiment.

FIG. 4 is an exemplary structure of a drying machine according to another embodiment. FIG. 5 is a block diagram illustrating a drying machine according to another embodiment.

Referring to FIGS. 4 and 5, the drying machine 400 includes a control unit 410 for controlling a drying process, a main body 420 for forming an external appearance, a drum 430 rotatably installed in the main body 420, a drum 440 for opening or closing the drum, a driving assembly 450 to rotate the drum 430, and a drying assembly 460 for drying laundry to be dried within the drum 430.

The drying machine shown in FIGS. 4 and 5 according to another embodiment is identical to the drying machine shown in FIGS. 2 and 3 according to one embodiment.

Differently from the drying machine according to one embodiment, the drying machine shown in FIGS. 4 and 5 according to another embodiment includes two heaters 461*a* and 461*b* in the drying assembly 460. The remaining same elements other than the drying assembly 460 including two heaters 461*a* and 461*b* will herein be omitted for convenience of description.

The drying assembly 460 includes first and second heaters 461*a* and 461*b* to heat air to be sucked into the drum, a suction duct 462 for directing air heated by the first and second heaters 461*a* and 461*b* to the inside of the drum 430, a fan 463 for ventilating high temperature and humidity air contained in the drum 430, a fan case 464 for accommodating the fan 463, a discharge duct 465 for discharging the air sucked by the fan 463 to the outside, a filter duct 466 provided between the fan 463 and the drum 430, and a filter 467 contained in the filter duct 466.

The first heaters 461*a* and 461*b* have different electric capacities (i.e., different power consumptions). Provided that the sum of electric capacities of the first and second heaters 461*a* and 461*b* is denoted by 100%, the first heater 461 a occupies power consumption of 70%, and the second heater 461*b* occupies power consumption of about 30%. That is, the ratio of electric capacities of the first and second heaters 461*a* and 461*b* is 70:30. Therefore, power consumption of the first heater is 70%, and power consumption of the second heater is 30%. The operation rates of the heaters 461*a* and 461*b* are controlled on the basis of the operation rate of 100% indicating the sum of power consumption of the heaters 461*a* and 461*b*.

In addition, the same electric capacity is assigned to two heaters such that only one of two heaters may also be operated in a low-temperature drying section.

Referring to FIG. 5, the control unit 410 of the drying machine 400 includes a second communication unit 411, a second controller 412, a second storage unit 413, a second input unit 414, a second display 415, a second sound unit 416, a power measurement unit 417, a detection unit 418, and a load drive unit 419.

In accordance with another embodiment shown in FIG. 5, the second controller 412, the second storage unit 413, and the load drive unit 419 are identical to those of FIG. 3, and as such detailed descriptions thereof will herein be omitted for convenience of description.

Some parts of the second controller 412 shown in FIG. 3 are identical to those of the second controller 412 shown in FIG. 5, and as such detailed descriptions thereof will be omitted herein for convenience of description.

The second controller 412 calculates humidity variation (i.e., humidity variation per unit time (drying rate)) on the basis of the drum 430's humidity detected through the humidity detection unit 418*a*, and divides the drying section of the drying procedure according to the calculated humidity variation (i.e., the drying rate) into several sub-drying sections, such that it controls any one of the operation rates from among several loads (first heater, second heater, and motor).

That is, the second controller 412 determines which load is operated in each drying section, and controls the operation rate of the highest-power-consumption load from among the determined loads.

In this case, the drying section includes a heating drying section in which the air of the drum 430 is heated and a non-heating drying section in which the air of the drum 430 is not heated. The heating drying section includes a high-temperature drying section in which the air provided to the drum 430 is heated to high temperature and a low-temperature drying section in which the air provided to the drum 430 is heated to low temperature.

In more detail, during the high-temperature drying section, the first and second heaters 461*a* and 461*b* are turned on so that they are operated at the operation rate of 100%. If a predetermined time has elapsed, the motor 451 is operated at 100% under the condition that the operation rates of the first and second heaters 461*a* and 461*b* are maintained at 100%, the drum 430 and its peripheral part quickly reach a target temperature. If the drum 430 reaches the target temperature, the drum temperature can be maintained at the target temperature during the high-temperature drying section. In this case, moisture or humidity contained in the object to be dried can be quickly dried and removed.

During the low-temperature drying section, if humidity variation of the drum 430 is less than reference humidity variation, the first heater 461 a is turned off (i.e., the operation rate of 0%), the second heater 461*b* is turned on (i.e., the operation rate of 30%), and the operation rate 100% of the motor 451 is maintained, such that the temperature of the drum 430 can be maintained at low temperature.

In the low-temperature drying section, the exhaust temperature rapidly increases so that humidity of the drum 430 is rapidly reduced. In this case, since the object to be dried has little water or humidity, the object to be dried can be sufficiently dried even at low temperature.

In the non-heating drying section, the first and second heaters 461*a* and 461*b* are turned off (i.e., the operation rate of 0%), the motor 451 is operated at the operation rate of 1005, and the air contained in the drum 430 circulates. In this case, hot air contained in the drum 430 is discharged by ventilation so that the temperature of the drum 430 and the temperature of the target object to be dried can be decreased. In this case, the operation rate for each drying section may be changed in response to a material of the object to be dried and the drying mode.

If the power rates encountered during the drying time are identical to or less than the reference power rates, the second controller 412 is controlled at the pre-stored operation rate of the motor 451, is controlled at the operation rate of the first heater 461*a*, or is controlled at the operation rate of the second heater 461*b*.

That is, the second controller 412 controls the high-temperature drying operation in which the first and second heaters 461*a* and 461*b* and the motor 451 are operated at the operation rate of 100%. If the humidity variation is less than the reference humidity variation during the high-temperature drying operation, the second controller 412 controls a low-temperature drying operation in which the first heater 461*a* is turned off (i.e., the operation rate of 0%) and the second heater 461*b* is turned on (i.e., the operation rate of 30%), so that the motor 451 is operated at the operation rate of 100%. If a predetermined low-temperature drying time has elapsed, the second controller 412 controls the non-heating drying operation in which the first and second heaters 461 are operated at the operation rate of 0% and the motor 451 is operated at the operation rate of 100%.

In addition, when the second controller 412 is in the low-temperature drying control mode, it may turn the heater 461 on or off according to the exhaust temperature detected by the temperature detection unit 481*b*.

The second storage unit 4132 stores the power rates for each hour and also stores the reference power rates.

The second storage unit 413 stores power consumption of each of the motor 451 and the first and second heaters 461*a* and 461*b*, and stores not only the operation rates of the first and second heaters 461*a* and 461*b* in response to the power rate increasing rate but also the operation rate of the motor 451 in response to the power rate increasing rate.

The load drive unit 419 includes a heater driver 419*a* for driving each of the first and second heaters 461*a* and 461*b* in response to the indication message of the second controller 412, and a motor driver 418*b* for driving the motor 451 in response to the indication message of the second controller 412.

Figure 6:
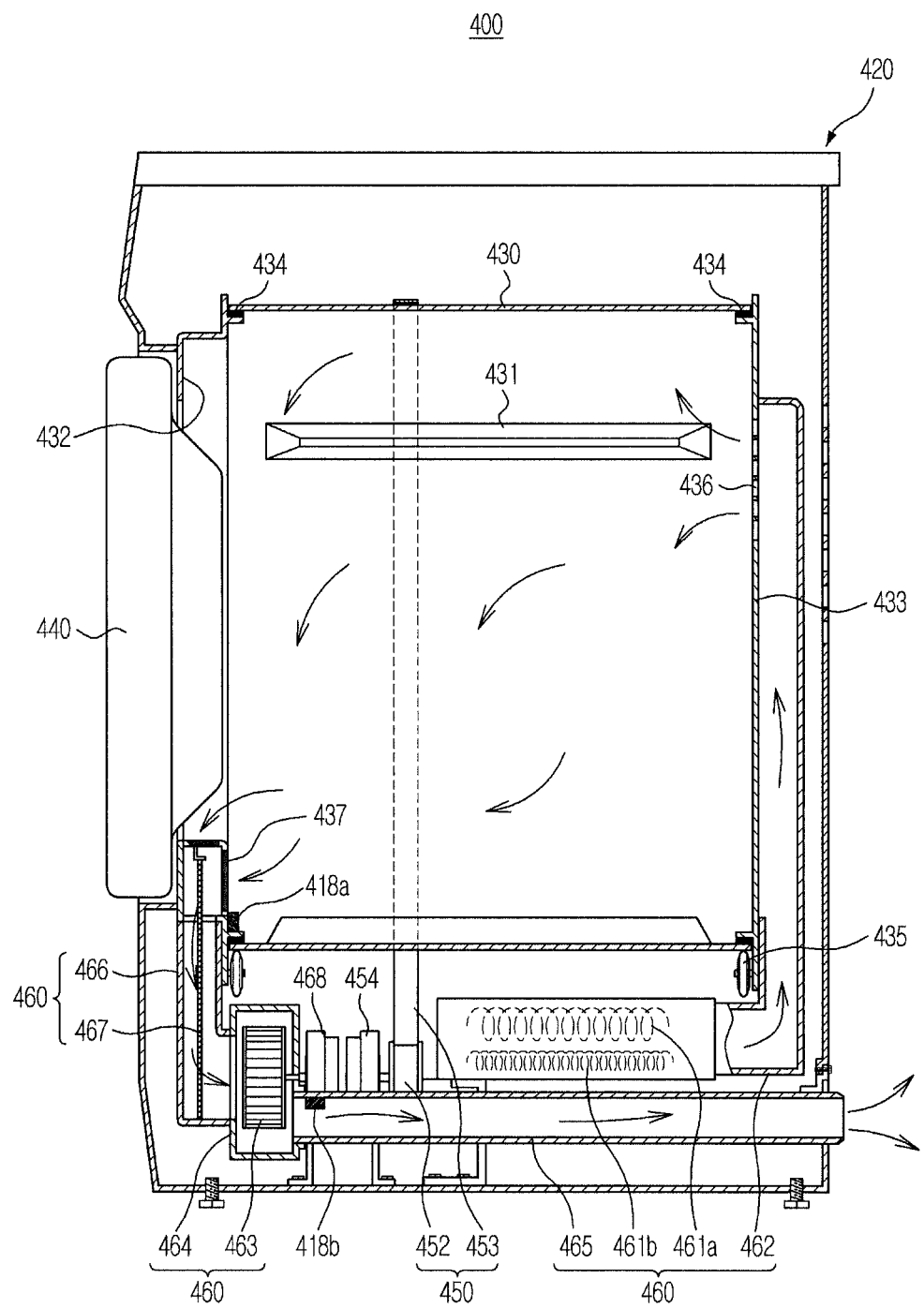
FIG. 6 is an exemplary structure of a drying machine according to still another embodiment.
Figure 7:
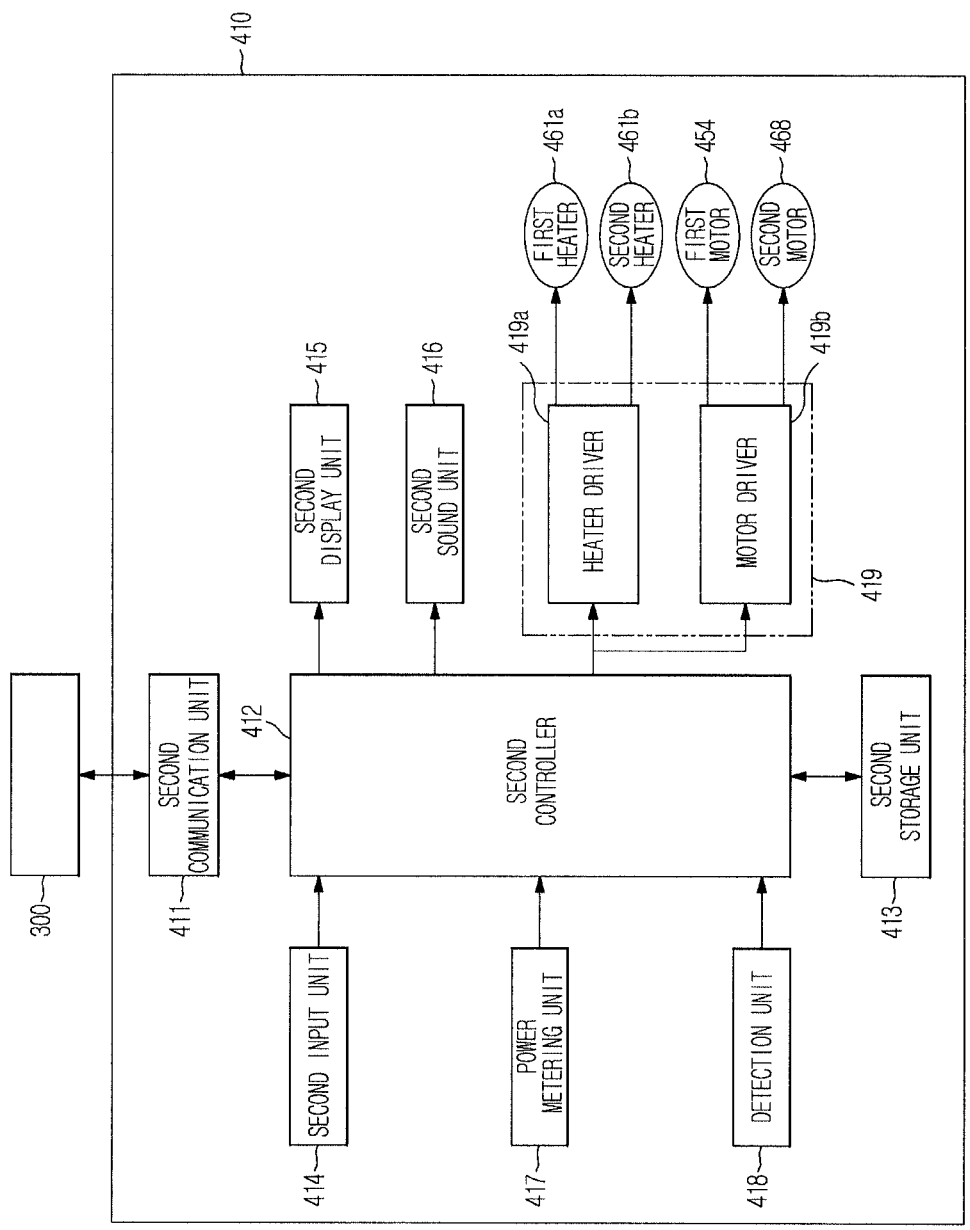
FIG. 7 is a block diagram illustrating a drying machine according to still another embodiment.

FIG. 6 is an exemplary structure illustrating a control unit contained in the drying machine according to still another embodiment. FIG. 7 is a block diagram illustrating a drying machine according to still another embodiment.

Referring to FIGS. 6 and 7, the drying machine 400 includes a control unit 410 for controlling a drying process, a main body 420 for forming an external appearance, a drum 430 rotatably installed in the main body 420, a drum 440 for opening or closing the drum, a driving assembly 450 to rotate the drum 430, and a drying assembly 460 for drying laundry to be dried within the drum 430.

The drying machine shown in FIGS. 6 and 7 according to still another embodiment is identical to the drying machine shown in FIGS. 2 and 3 according to one embodiment.

Differently from the drying machine according to one embodiment, the drying machine shown in FIGS. 6 and 7 according to another embodiment includes the first motor 454 in the drying assembly 450, and includes several heaters 461*a* and 461*b* and the second motor 468 in the drying assembly 460. The remaining same elements other than the drying assembly 460 including the two heaters 461*a* and 461*b* and the second motor 468 will herein be omitted for convenience of description.

The drying assembly 460 includes first and second heaters 461*a* and 461*b* to heat air to be sucked into the drum, a suction duct 462 for directing air heated by the first and second heaters 461 a and 461 b to the inside of the drum 430, a fan 463 for ventilating high temperature and high humidity air contained in the drum 430, a fan case 464 for accommodating the fan 463, a discharge duct 465 for discharging the air sucked by the fan 463 to the outside, a filter duct 466 provided between the fan 463 and the drum 430, and a filter 467 contained in the filter duct 466. In this case, it may be possible to include only one heater in the drying assembly 460.

The drive assembly 450 includes a motor 454 installed at a lower part of the inner part of the main body 420, a pulley 452 for receiving power from the motor 454 so as to be rotated, and a belt 453 to rotate the drum 430 simultaneously while being rotated by rotation of the pulley 452.

That is, the belt 453 is installed to be wound on the outer circumference of the pulley 452 and the outer circumference of the drum 430, such that the pulley 452 is rotated in response to the driving of the motor 454 and the drum 430 is also rotated.

The drying assembly 460 includes a heater 461 to heat air to be sucked into the drum, a suction duct 462 for directing air heated by the heater 461 to the inside of the drum 430, a fan 463 for ventilating high temperature and humidity air contained in the drum 430, a fan case 464 for accommodating the fan 463, a discharge duct 465 for discharging the air sucked by the fan 463 to the outside, a filter duct 466 provided between the fan 463 and the drum 430, a filter 467 contained in the filter duct 466, and a second motor 468 to rotate the fan 463.

Referring to FIG. 7, the control unit 410 of the drying machine 400 includes a second communication unit 411, a second controller 412, a second storage unit 413, a second input unit 414, a second display 415, a second sound unit 416, a power measurement unit 417, a detection unit 418, and a load drive unit 419.

In accordance with still another embodiment shown in FIG. 7, the second controller 412, the second storage unit 413, and the load drive unit 419 are identical to those of FIG. 3, and as such detailed descriptions thereof will herein be omitted for convenience of description.

Some parts of the second controller 412 shown in FIG. 7 are identical to those of the second controller 412 shown in FIG. 5, and as such detailed descriptions thereof will be omitted herein for convenience of description.

The second controller 412 calculates humidity variation (i.e., humidity variation per unit time (drying rate)) on the basis of the drum 430's humidity detected through the humidity detection unit 418*a*, and divides the drying section of the drying procedure according to the calculated humidity variation (i.e., the drying rate) into several sub-drying sections, such that it controls any one of the operation rates from among several loads (first heater, second heater, first motor, and second motor).

That is, the second controller 412 determines which load is operated in each drying section, and controls the operation rate of the highest power consumption load from among the determined loads.

In this case, the dry interval includes a heating drying section in which the air of the drum 430 is heated and a non-heating drying section in which the air of the drum 430 is not heated. The heating drying section includes a high-temperature drying section to heat the air provided to the drum 430 to high temperature, and a low-temperature drying section to heat the air provided to the drum 430 to low temperature.

In more detail, in the case of the high temperature drying section, the first and second heaters 461*a* and 461*b* are turned on so that they are operated at the operation rate 100%. Then, if a predetermined time has elapsed, the first and second motors 454 and 468 are maintained at the operation rate of 100% under the condition that the operation rates of the first and second heaters 461*a* and 461*b* are maintained at 100%, such that the drum 430 and its peripheral temperature quickly reach a target temperature. If the drum 430 reaches the target temperature, the drum 430 can be maintained at the target temperature during the high temperature drying section. In this case, moisture or humidity contained in an object to be dried can be removed within a short time.

In the case of the low temperature drying section, if humidity variation in the drum 430 is less than the reference humidity variation, the first heater 461*a* is turned off so that the first heater is operated at the operation rate of 0%, and the second heater 461*b* is turned on so that the second heater is operated at the operation rate of 30%. In this way, the first and second motors 454 and 468 are operated at the operation rate of 100%, such that the drum 430 is maintained at a low temperature.

During the low temperature drying section, as a temperature of the exhaust air is rapidly increased, humidity contained in the drum 430 is rapidly reduced. In this case, an object to be dried has little humidity, such that it can be sufficiently dried even at a low temperature.

In the case of the non-heating drying section, the first and second heaters 461a and 461b stop operation (i.e., the operation rate of 0%), and the first and second motors 454 and 468 are operated at the operation rate of 100%, such that the air contained in the drum 430 is circulated. In this case, hot air contained in the drum 430 is discharged to the outside by a ventilation operation, such that a temperature of the drum 430 and a temperature of laundry contained in the drum 430 can be lowered.

In this case, the load operation rate for each drying section may be changed in response to a material of the object to be dried and the drying mode.

If power rates encountered for the drying process are equal to or less than reference power rates, the second controller 412 is controlled at a predetermined (or prestored) operation rate of the motor 451, or is controlled at the operation rate of the first or second heater 461a or 461b.

In more detail, the second controller 412 enables each of the first and second heaters 461a and 461b and the first and second motors 454 and 468 to be operated at the operation rate of 100% in such a manner that a high temperature drying mode is carried out. In the case of the high temperature drying mode, if humidity variation is less than a reference humidity variation, the first heater 461a is turned off and the second heater 461b is turned on to be operated at the operation rate of 30%, and the first and second motors 454 and 468 are operated at the operation rate of 100% in such a manner that a low temperature drying mode is carried out. If the low temperature drying time reaches a predetermined period of time, the first and second heaters 461 stop operation and the motors 454 and 468 are operated at the operation rate of 100% in such a manner that the non-heating drying mode is controlled.

In addition, during the low temperature drying control mode, the second controller 412 may also turn the heaters 461 on or off in response to the exhaust air temperature detected by the temperature detection unit 418b.

The second storage unit 413 stores power rates for each hour and reference power rates for each hour.

The second storage unit 413 stores power consumption of each of the first and second motors 454 and 468 and power consumption of each of the first and second heaters 461a and 461b, and stores the operation rate of each of the first and second heaters 461a and 461b and the operation rate of each of the first and second motors 454 and 468 in response to the increasing rate of power rates.

The load drive unit 419 includes a heater driver 419a for driving the first and second heaters 461a and 461b in response to a message from the second controller 412, and a motor driver 419b for driving the first and second motors 454 and 468 in response to a message from the second controller 412.

Meanwhile, although the exhaust-type drying machine has been disclosed as an example of the drying machine according to one embodiment, it should be noted that the condensing-type drying machine can also be applied to the embodiment without change. In addition, the above-mentioned drying machine can be applied even to the drying process of the washing machine.

Figure 8:
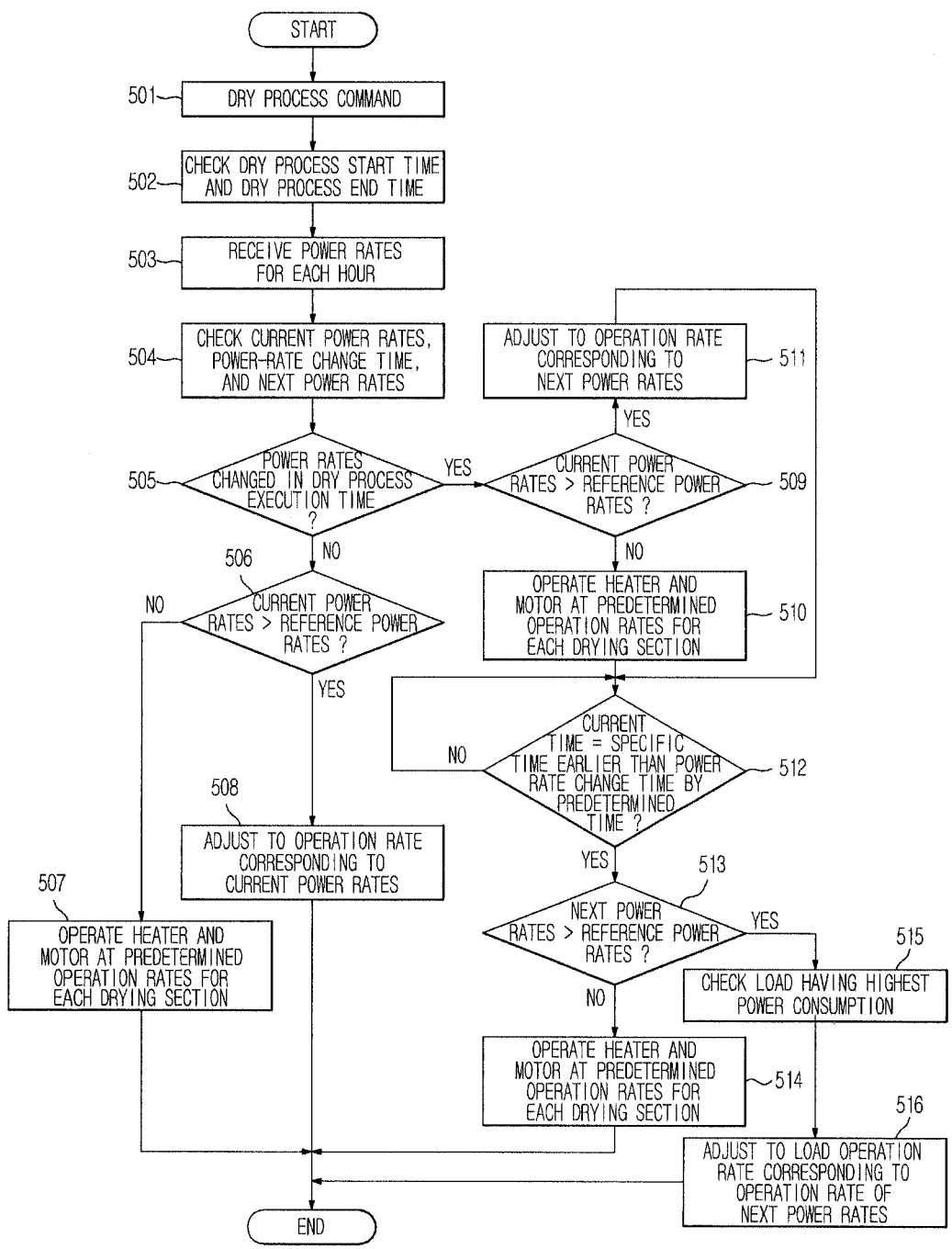
FIG. 8 is a flowchart illustrating a drying machine according to each embodiment.
Figure 9:
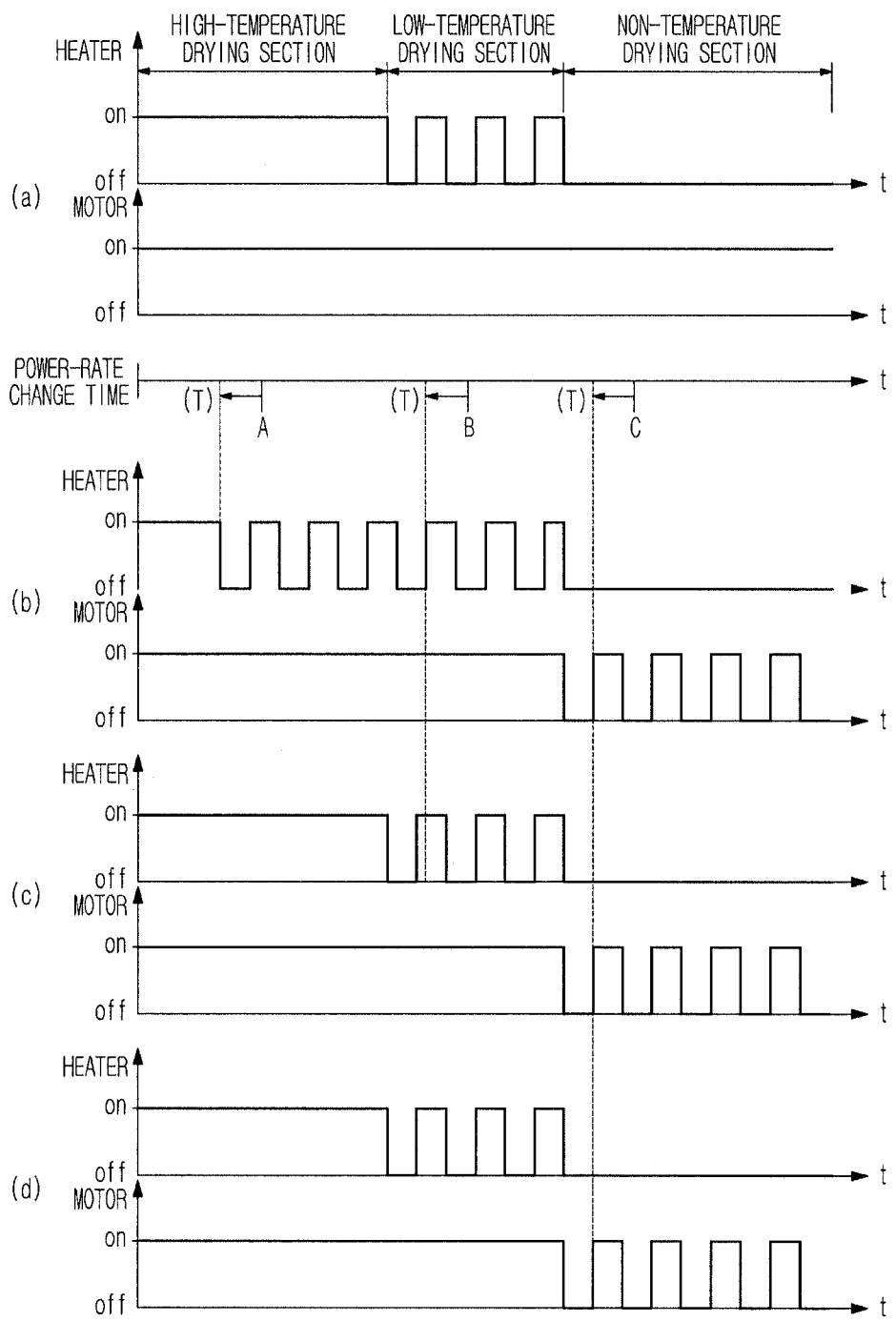
FIGS. 9, 10A, 10B, 10C, 10D, and 11 exemplarily illustrate a control process of a drying machine according to individual embodiments.

FIG. 8 is a flowchart illustrating a drying machine according to each embodiment. FIGS. 9 to 11 exemplarily illustrate a control process of a drying machine according to individual embodiments.

If the command for executing the drying process is entered by the user, a current time reaches a drying process reservation time, or the EMS 300 transmits the drying process execution command, the drying process start time and the drying process execution time are confirmed such that the drying process end time is confirmed at operation 502.

Thereafter, the drying machine receives the power rates for each hour from the EMS 300 at operation 503. In operation 502, the drying machine recognizes the current power rates, the next power rates, and a time caused by the next power rates on the basis of the received power rates for each hour. In addition, the drying machine further checks the maintenance time of the next power rates.

The drying machine determines whether the power-rate change time is within the drying process execution time in operation 505. If the power-rate change time is not within the drying process execution time in operation 505, the drying machine compares the current power rates with the reference power rates in operation 506 so that it determines whether the current power rates are higher than the reference power rates. If the current power rates are equal to or less than the reference power rates, the drying machine operates the motor 451 and the heater 461 at predetermined operation rates for individual drying sections in operation 507.

For example, the predetermined operation rates according to one embodiment are as follows. That is, in the case of the high temperature drying section, the operation rate of the heater 461 is set to 100% and the operation rate of the motor 451 is set to 100%. In the low temperature drying section, the operation rate of the heater 461 is set to 50%, and the operation rate of the motor 451 is set to 100%. In the non-heating drying section, the operation rate of the heater 461 is set to 0% and the operation rate of the motor 451 is set to 100%. Such a predetermined operation rate may be changed in response to a drying mode or a material of the object to be dried.

On the other hand, if the current power rates are higher than the reference power rates, the drying machine determines the increasing rate of the current power rates on the basis of the reference power rates, and reduces the load operation rate in response to the determined increasing rate in operation 508.

In this case, the drying machine determines which load has the highest power consumption from among several loads operated in each drying section. In addition, the drying machine can search for data stored in the second storage unit 413 and then determine the searched data.

In other words, the load having the highest power consumption in each of the high temperature drying section and the low temperature drying section is the heater 461, and the load having the highest power consumption in the non-heating drying section is the motor 451. In the high temperature drying section or the low temperature drying section, the operation rate of the heater 461 is reduced. In the non-heating drying section, the operation rate of the motor 451 is reduced.

In this case, if the current power rates are higher than the reference power rates, this means that many homes are requesting much power from the power provider 100, such that there is a high possibility of increasing the number of power plants.

Therefore, when the current power rates are higher than the reference power rates, power consumption of the drying machine is reduced so that total of power requested in the power provider 100 by many homes can be reduced. As a result, environmental destruction caused by additional electricity generation of the power plants can also be reduced.

If the power-rate change time is within the drying process execution time, the drying machine compares the current power rates with the reference power rates, and compares the next power rates with the reference power rates in such a manner that the load operation rate can be adjusted.

In more detail, the drying machine compares the current power rates with the reference power rates in operation 509 so that it determines whether the current power rates are higher than the reference power rates. If the current power rates are equal to or less than the reference power rates, the motor 451 and the heater 461 are operated at the predetermined operation rates for individual drying sections in operation 510.

On the other hand, if the current power rates are higher than the reference power rates, the drying machine determines the increasing rate of the current power rates on the basis of the reference power rates, and reduces the load operation rate in response to the determined increasing rate in operation 511.

In this case, the drying machine recognizes which load has the highest power consumption from among several loads operated in respective drying sections, and reduces the recognized load operation rate.

Then, the drying machine determines whether a current time is located prior to a predetermined time (T) from the power-rate change time in operation 512.

If the current time is located prior to the predetermined time T from the power-rate change time, the drying machine compares the next power rates with the reference power rates in operation 513 so that it determines whether the next power rates are higher than the reference power rates.

In this case, if the next power rates are equal to or less than the reference power rates, the motor 451 and the heater 461 are operated at predetermined operation rates for each drying section in operation 514.

On the other hand, if the next power rates are higher than the reference power rates, the drying machine determines the drying section at a specific time located ahead of a predetermined time from the power-rate change time, and then confirms which load (i.e., the motor and the heater) has the highest power consumption within the determined drying section in operation 515.

The drying machine calculates the increasing rate of the next power rates on the basis of the next reference power rates, and reduces the load operation rate in response to the calculated power rate increasing rate in operation 516.

The drying machine confirms the maintenance time of the next power rates so that it determines the presence or absence of additional power rate variation. If additional power rate variation occurs before completion of the drying process, the drying machine performs operations 505 to 516.

The drying machine performs the drying process and at the same time periodically receives the future power rates and the future power rate change time from the power provider 300, and may also adjust the operation rates of several loads on the basis of the received future power rates and the received power rate change time.

In accordance with still another embodiment, the technical idea of this embodiment may also be applied to the drying process of the washing machine capable of further performing the drying process and the washing process at the same time. In this case, the first motor is directly mounted to the drum so that the drum is rotated, and the second motor is directly mounted to an external fan of the drum so that the fan is rotated.

One embodiment will hereinafter be described with reference to FIG. 9.

Referring to FIG. 9, part (a), if the power rates are equal to or less than the reference power rates during the drying process of the drying machine, the heater 461 is operated at the operation rate of 100% and the motor 451 is operated at the operation rate of 100% during the high temperature drying section. In the low temperature drying section, the heater 461 is operated at the operation rate of 50% and the motor 451 is operated at the operation rate of 100%. In the non-heating drying section, the heater 461 is operated at the operation rate of 0% and the motor 451 is operated at the operation rate of 100%.

Referring to FIG. 9, part (b), if the current power rates are higher than the reference power rates at a certain point A of the high temperature drying section, the heater 461 is operated at the operation rate of 100% in the range from the high temperature drying start time to a specific time earlier than the power-rate change time A by a predetermined time T, and the motor 451 is operated at the operation rate of 100%. Then, if the current time reaches a specific time located ahead of the change time A by the predetermined time T, the operation rate of the heater having the highest power consumption is adjusted in the high temperature drying section. That is, if the power saving rate is set to 50%, the operation rate of the heater 461 is reduced by 50% in response to the power saving rate of 50%.

In the low temperature drying section, the highest power consumption load is the heater 461. In this case, the heater 461 is preset to the operation rate of 50%. Therefore, during the low temperature drying section, the heater 461 is maintained and operated at the operation rate of 50%, and the motor 451 is operated at the operation rate of 100%.

In the non-heating drying section, the highest power consumption load is the motor 451, and the operation rate of the motor 451 is reduced by 50%. In this case, the motor 451 is turned on or off at the ratio of 50:50 until the non-heating drying section is ended.

In this way, from a specific time located ahead of the power-rate change time A by a predetermined time, any one of the load operation rates is adjusted according to individual drying sections, such that total power consumption of the drying machine can be reduced by about 50% in the range from a start time located ahead of the change time A by a predetermined time to the drying process end time.

Referring to FIG. 9, part (c), if the current rates are higher than the reference power rates at a specific time B of the low temperature drying section, the heater 461 and the motor 451 are operated at the operation rate of 100% during the high temperature drying section.

In the low temperature drying section, the heater 461 is operated at the operation rate of 50%, and the motor 451 is operated at the operation rate of 100%. Then, if the current time reaches a specific time located ahead of the change time B by a predetermined time T, the drying machine determines the highest power consumption load in the low temperature drying section. In this case, the operation rate of the heater 461 corresponding to the determined load is adjusted and operated.

That is, if the power saving rate is set to 50%, the operation rate of the heater 461 is adjusted to 50% in response to the power saving rate of 50%. In this case, the operation rate of the heater 461 is preset to 50%, so that the operation rate of the heater 461 is maintained and operated and the motor 451 is operated at the operation rate of 100%.

For example, provided that the power saving rate is set to 80%, the operation rate of the heater 461 is set to 50% in the low temperature drying section, and a power saving rate caused by the operation rate 50% of the heater 461 is set to 50%, so that it is necessary to add the power consumption rate of 30%. As a result, the operation rate of the heater 461 needs to be further reduced by 30%. As a result, the heater 461 is operated at the operate rate of 20%, and the motor 451 is operated at the operation rate of 100%.

In this way, if the current operation rate is less than the corresponding operation rate, the current operation rate is maintained. If the current operation rate is higher than the operation rate corresponding to the power saving rate, the current operation rate is reduced in response to the power saving rate, resulting in power saving.

In the non-heating drying section, the operation rate of the highest power consumption motor 451 is reduced and operated, and the operation rate of the motor 451 is reduced to 50% in response to the power saving rate of 50% so that the motor 451 is operated at the operation rate of 50%. In this case, the motor 451 is turned on or off at the ratio of 50:50 until the non-heating drying section is ended.

In this way, from a specific time located ahead of the power-rate change time B by a predetermined time, any one of the load operation rates is adjusted according to individual drying sections, such that total power consumption of the drying machine can be reduced by about 50% in the range from a start time located ahead of the change time B by a predetermined time to the drying process end time.

Referring to FIG. 9, part (d), if the current rates are higher than the reference power rates at a specific time of the non-heating drying section, the heater 461 and the motor 451 are operated at the operation rate of 100% during the high temperature drying section. In addition, in the low temperature drying section, the heater 461 is operated at the operation rate of 50%, and the motor 451 is operated at the operation rate of 100%. In this case, it is assumed that the operation rate is reduced to 50% in response to the power saving rate of 50%.

In the non-heating drying section, the heater 461 is turned off and the motor 451 is operated at 100%. Thereafter, if the current time reaches a specific time located ahead of the change time C by a predetermined time T, the operation rate of the highest power consumption motor 451 is reduced, such that the motor 451 is operated at the low operation rate, and the motor 451 is set to the operation rate of 50% in response to the power saving rate of 50%.

In this case, the motor 451 is turned on or off at the ratio of 50:50 until the non-heating drying section is ended.

In this way, from a specific time located ahead of the power-rate change time C by a predetermined time, any one of the load operation rates is adjusted according to individual drying sections, such that total power consumption of the drying machine can be reduced by about 50% in the range from a start time located ahead of the change time C by a predetermined time to the drying process end time.

Other embodiments will hereinafter be described with reference to FIGS. 10A and 10B.

Figure 10A:
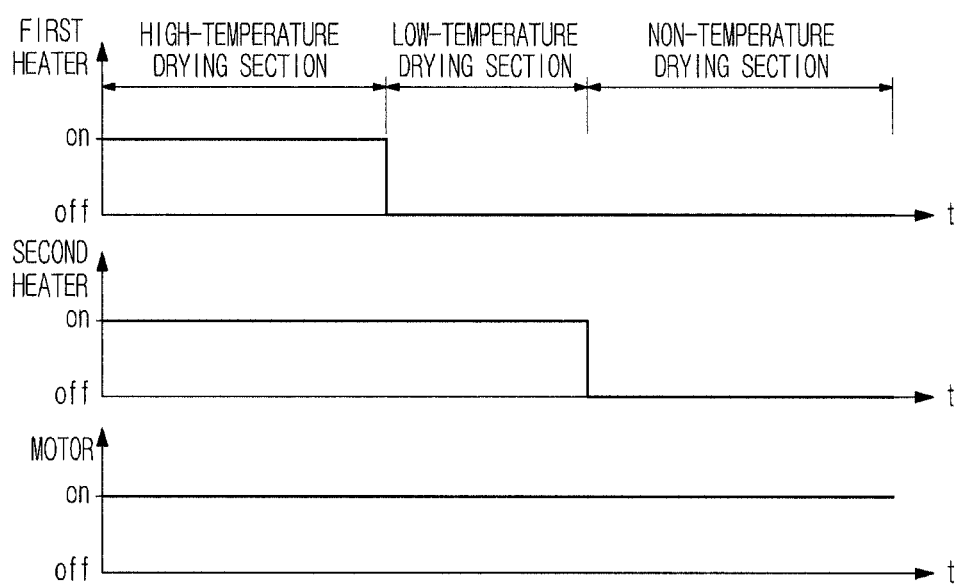
Figure 11:
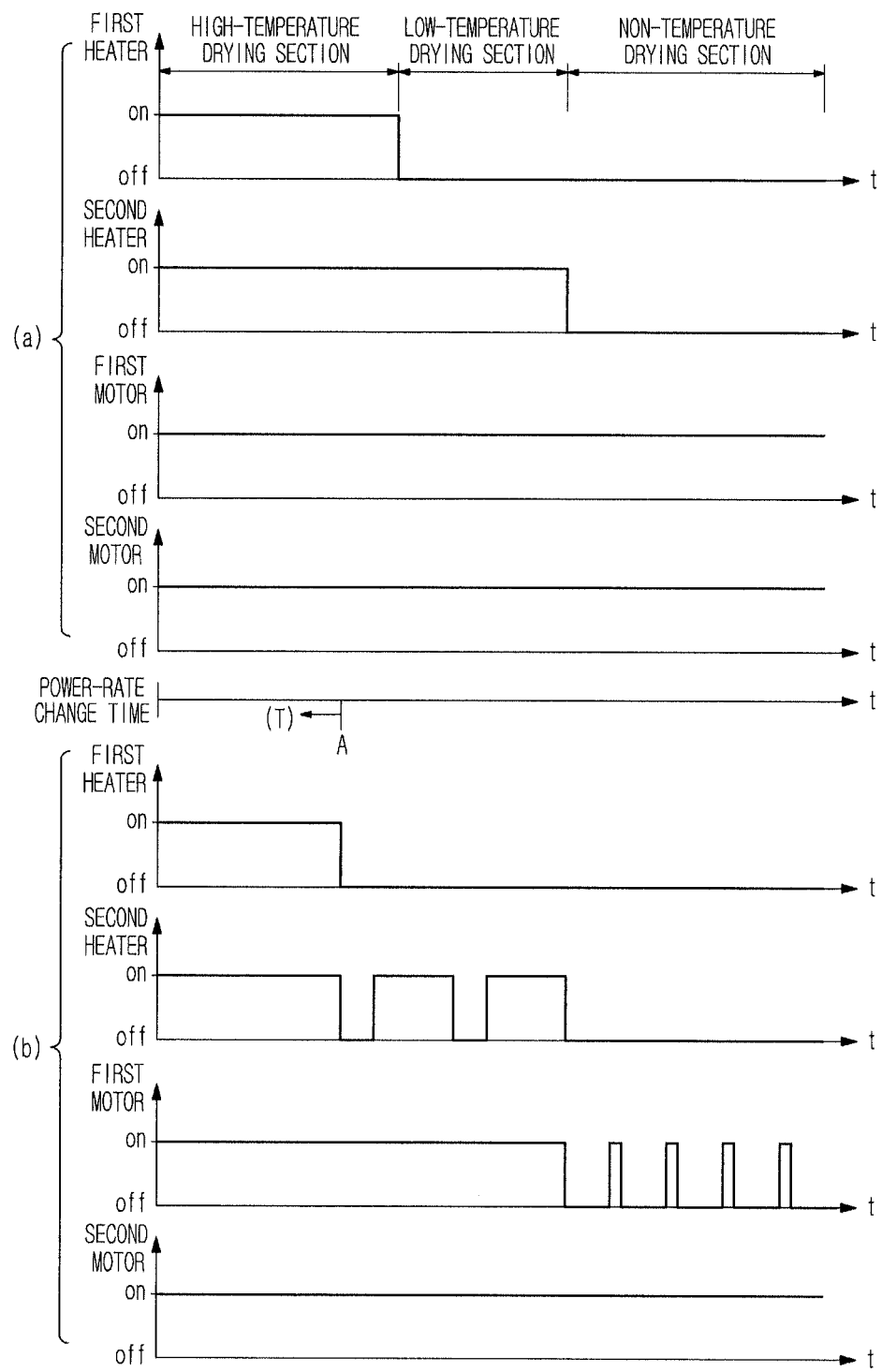

Referring to FIG. 10A, if the power rates are less than the reference power rates during the drying process of the drying machine, in the high temperature drying section, the first and second heaters 461a and 461b are operated at the operation rate of 100% and the motor 451 is operated at the operation rate of 100%. In the low temperature drying section, the first heater 461a is turned off and the second heater 461b is turned on so that the operation rate of 30% is provided and the motor 451 is operated at the operation rate of 100%. In the non-heating drying section, the first and second heaters 461a and 461b are turned off (i.e., the operation rate of 0%), and the motor 451 is operated at the operation rate of 100%.

In this case, electric capacity of the first heater 461a is set to 70%, and electric capacity of the second heater 461b is set to 30%, so that total of electric capacity of the two heaters 461a and 461b is denoted by 100%.

Therefore, if the first heater 461a is turned on, the operation rate is changed to 70%. If the second heater 461b is turned on, the operation rate is changed to 30%, so that power consumption of the first heater 461a is 70% and power consumption of the second heater 461b is 30%.

Figure 10B:
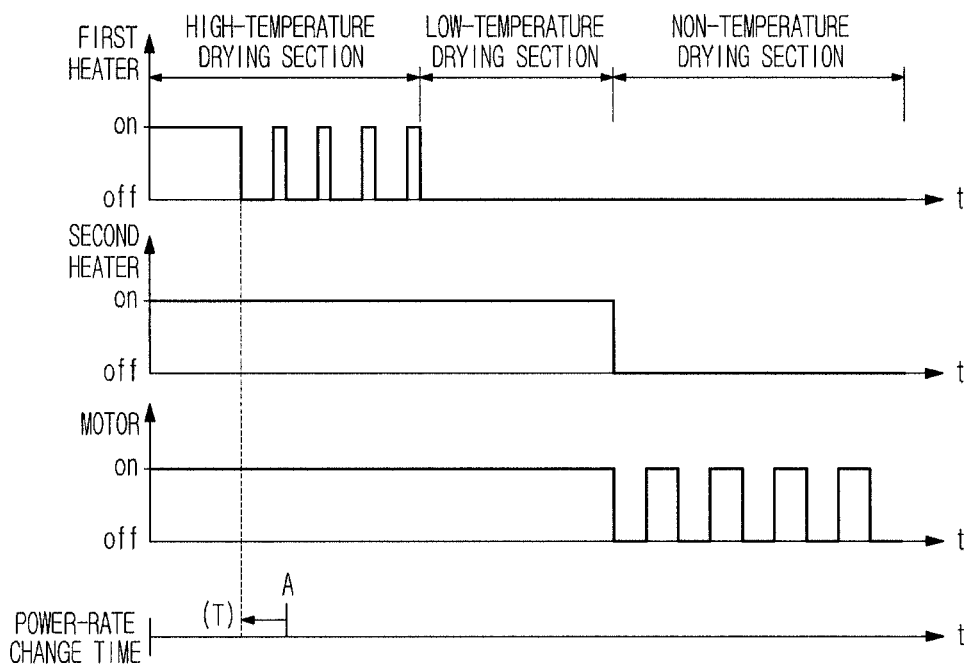

Referring to FIG. 10B, if the current power rates are higher than the reference power rates at a certain point of the high temperature drying section, the first and second heaters 461a and 461b are operated at the operation rate of 100% in the range from the high temperature drying start time to a specific time earlier than the power-rate change time A by a predetermined time T, and at the same time the motor 451 is operated at the operation rate of 100%. Then, if the current time reaches a specific time located ahead of the change time A by the predetermined time T, the operation rate of the first heater 461a having the highest power consumption is reduced from the reached specific time.

In this case, if the power saving rate is set to 50%, the operation rate of the first heater 461a is reduced by 50% in response to the power saving rate of 50%.

Since the first heater 461a is operated at the operation rate of 70%, the first heater 461a is operated only at the partial operation rate of 20% from among the total operation rate of 70% provided to the first heater 461a and the second heater 461b is turned on in such a manner that the power saving rate is set to 50%.

For example, in order for the first heater 461a to reach the operation rate of 20%, if it is assumed that one period is set to 100 seconds, the first heater 461a is turned on for 28 seconds and is turned off for 72 seconds, and the second heater 461b is turned on for 100 seconds.

In the range from a specific time located ahead of the change time A by a predetermined time T to the end time of the high temperature drying section, the first heater 461a is operated at the operation rate of 20%, the second heater 461b is turned on, and the motor 451 is operated at the operation rate of 100%.

In order to achieve the power saving rate of 50% in the low temperature drying section, the operation rate of each of the first and second heaters needs to be reduced by 50%. However, during the low temperature drying section, the first heater 461a is turned off and the second heater 461b is turned on so that the first and second heaters are operated at a total operation rate of 30%.

Therefore, during the low temperature drying section, the first heater is turned on and the second heater is turned on, so that the motor 451 is operated at the operation rate of 100%.

In the non-heating drying section, the highest power consumption load is set to the motor 451, and the operation rate of the motor 451 is reduced by 50% so that the motor 451 is operated at the operation rate of 50%. In this case, the motor 451 is turned on or off at the ratio of 50:50 in the non-heating drying mode.

In this way, from a specific time located ahead of the power-rate change time A by a predetermined time, any one of the load operation rates is adjusted according to individual drying sections, such that total power consumption of the drying machine can be reduced by about 50% in the range from a start time located ahead of the change time A by the predetermined time to the drying process end time.

Figure 10C:
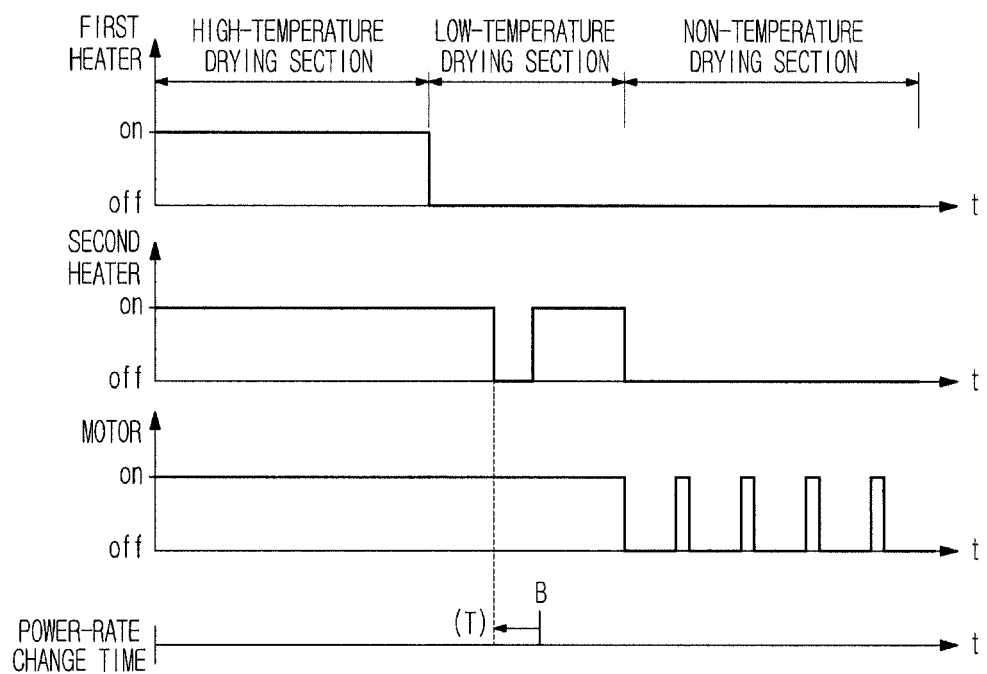

Referring to FIG. 10C, if the current rates are higher than the reference power rates at a specific time B of the low temperature drying section, the first and second heaters 461a and 461b and the motor 451 are operated at the operation rate of 100% during the high temperature drying section.

If the power saving rate is set to 80%, it is assumed that the load operation rate is set to 20% in response to the power saving rate of 80%.

That is, during the low temperature drying section, the first heater is turned off, the second heater 461b is turned on, and the motor 451 is operated at the operation rate of 100%. Thereafter, if the current time reaches a specific time located ahead of the change time B by a predetermined time T, in association with power consumption of the low temperature drying section, the operation rate of the first or second heater is reduced to 20%, and the motor 451 is operated at the operation rate of 100%.

In this case, the power saving rate reaches 70% as the first heater is turned off, and the power saving rate needs to be further reduced by 10%. Accordingly, the operation rate of the second heater is adjusted in such a manner that the power saving rate of 10% is achieved. Accordingly, if it is assumed that one period is 100 seconds, the second heater is turned on for 33 seconds and is turned off for 64 seconds.

In the non-heating drying section, the operation rate of the motor 451 having the highest power consumption from among several loads operated for the non-heating drying is reduced to 20%, so that the motor 451 is operated at the operation rate of 20%. In this case, the motor 451 is turned on for 20 seconds and is turned off for 80 seconds until the non-heating drying section is ended.

In this way, from a specific time located ahead of the power-rate change time B by the predetermined time, any one of the load operation rates is adjusted according to individual drying sections, such that total power consumption of the drying machine can be reduced by about 50% in the range from a start time located ahead of the change time B by the predetermined time to the drying process end time.

Figure 10D:
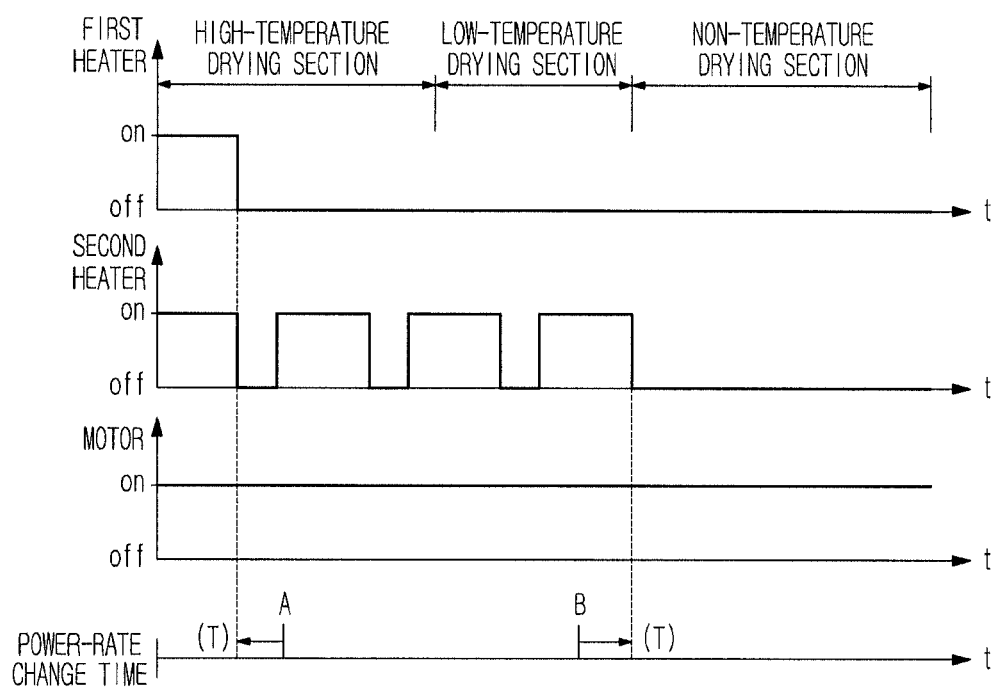

Referring to FIG. 10D, if the current power rates are higher than the reference power rates at a certain point A of the high temperature drying section and the current power rates are less than the reference power rates at a certain point B of the low temperature drying section, the first and second heaters 461a and 461b are operated at the operation rate of 100% in the range from the high temperature drying start time to a specific time earlier than the power-rate change time A by a predetermined time T, and at the same time the motor 451 is operated at the operation rate of 100%. Then, if the current time reaches a specific time located ahead of the change time A by the predetermined time T, the operation rates of the first and second heaters 461a and 461b each having the highest power consumption are reduced to 20%.

That is, if the power saving rate is set to 80%, the first heater is turned off so that its power saving rate is reduced by 70%, and the second heater is turned off so that its power saving rate is reduced by 10%. Therefore, the operation rate of the second heater is adjusted in such a manner that the power saving rate of 10% is achieved. Provided that one period is 100 seconds, the second heater is turned on for 33 seconds and is turned off for 64 seconds.

In the low temperature drying section, the highest power consumption load is the second heater 461b. During the low temperature drying mode, the operation rate of the second heater 461b is reduced to 50% so that the second heater 461b is driven at the operation rate of 50%. Then, if the current time reaches a specific time located after the change time B by a predetermined time T, the second heater 461b is increased to the operation rate of 100%, and the motor 451 is operated at the operation rate of 100%.

While the non-heating drying is performed in the non-heating drying section, the motor 451 is operated at the operation rate of 100%.

In this way, the operation rate of the highest power consumption load is adjusted between the change times A and B having the highest power rates, total power consumption of the drying machine can be reduced by about 50% only in a time of the high power rates.

Still another embodiment will hereinafter be described with reference to FIG. 11.

Referring to FIG. 11, part (a), if the current power rates are equal to or less than the reference power rates during the drying process of the drying machine, in the high temperature drying section, each of the first and second heaters 461a and 461b is driven at the operation rate of 100%, and each of the first and second motors 454 and 468 is driven at the operation rate of 100%. In the low temperature drying section, the first heater 461a is turned off, the second heater 461b is driven at the operation rate of 100%, each of the first and second motors 454 and 468 is driven at the operation rate of 100%. In the non-heating drying section, the first and second heaters 461a and 461b are turned off (i.e., the operation rate of 0%), and the first and second motors 454 and 468 are turned on (i.e., the operation rate of 100%).

Referring to FIG. 11, part (b), if the current power rates are higher than the reference power rates at a certain point A of the high temperature drying section and the current power rates, the first and second heaters 461a and 461b are driven at the operation rate of 100% in the range from the high temperature drying start time to a specific time earlier than the power-rate change time A by a predetermined time T, and at the same time the first and second motors 454 and 468 are driven at the operation rate of 100%. Then, if the current time reaches a specific time located ahead of the change time A by the predetermined time T, the operation rates of the first and second heaters 461a and 461b each having the highest power consumption are reduced.

If the power saving rate is set to 80%, the load operation rate is reduced to 20% in response to the power saving rate of 80%.

In this case, from a specific time located ahead of the change time A by a predetermined time T, the operation rate of the first or second heater 461a or 461b is reduced to 20%, so that the first or second heater 461a or 461b is operated and the first or second motor 454 or 468 is driven at the operation rate of 100%.

In other words, if the power saving rate is set to 80%, the first heater is turned off so that power consumption is reduced by 70%, the second heater is turned off so that the resultant power consumption can be further reduced by 10%.

Accordingly, the operation rate of the second heater 461b is adjusted in such a manner that the power saving rate of 10% is achieved. For example, if one period is 100 seconds, the second heater 461b is turned on for 33 seconds and is turned off for 64 seconds.

In the low temperature drying section, the first heater is turned off, so that the operation rate of the second heater is adjusted and the first or second motor 454 or 468 is operated at the operation rate of 100%.

In more detail, since the first heater is turned off during the low temperature drying section, power consumption can be reduced by 70%. Therefore, the resultant power consumption needs to be further reduced by 10% through the second heater. As a result, the operation rate of the second heater 461b is adjusted in such a manner that the power saving rate of 10% is achieved.

For example, provided that one period is 100 seconds, the second heater 461b is turned on for 33 seconds and is turned off for 64 seconds.

In the non-heating drying section, assuming that the highest power consumption load is the first motor 454, the operation rate of the first motor 454 is adjusted to 20%, so that the first motor 454 is driven at the operation rate of 20% and the second motor 468 is driven at the operation rate of 100%.

In this way, from a specific time located ahead of the power-rate change time A by a predetermined time, any one of the load operation rates is adjusted according to individual drying sections, such that total power consumption of the drying machine can be reduced by about 80% in the range from a start time located ahead of the change time A by the predetermined time to the drying process end time.

As is apparent from the above description, the drying machine and the method for controlling the same according to embodiments change the load operation rate before the power rates exceed the reference power rates, resulting in reduction in power consumption. Furthermore, as the drying machine and the method for controlling the same can prevent total power consumption from being rapidly increased, the power plant need not be additionally driven to generate more electricity. As a result, the drying machine and the method for controlling the same according to embodiments can reduce environmental impact and prevent the power rates from being increased.

In addition, the drying machine and the method for controlling the same according to embodiments can adjust the load operation rate in response to the determined rate, thereby preventing the drying function from being deteriorated.

The drying machine and the method for controlling the same according to embodiments can control the cycle of the drying machine, such that the total power consumption for each home is reduced and power consumption is prevented from exceeding allowable power consumption.

The operating method of the processor according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the processor supporting a method for controlling a drying machine described herein.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A drying machine comprising:
   a drum including an object to be dried;
   a fan to circulate air within the drum;
   a plurality of loads comprising a motor to rotate the drum and the fan and a heater to heat air provided to the drum;
   a communication unit to receive power rate information from an energy management system (EMS);
   an input unit to receive a drying process command from a user;
   a storage unit to store power consumption of each of the plurality of loads and store at least one load operated in each of a plurality of drying sections of the drying process; and
   a controller, upon receiving the drying process command, to recognize current power rates on the basis of the received power rate information, to determine whether the current power rates are higher than reference power rates, and to recognize a current drying section from among several drying sections of the drying process when the current power rates are higher than the reference power rates; and to adjust an operation rate of a load having a highest power consumption from among the at least one load operated in the current drying section,
   wherein the current drying section comprises a heating drying section and a non-heating drying section.

2. The drying machine according to claim 1,
   wherein the storage unit stores an operation rate corresponding to power rates,
   wherein the controller controls the determined load to be operated at an operation rate corresponding to the current power rates.

3. The drying machine according to claim 1, wherein the controller determines whether power rates are changed in a drying process on the basis of the power rate information for each hour, recognizes the next power rates when the power rates are changed in the drying process, determines whether the next power rates are higher than the reference power rates by comparing the next power rates with the reference power rates, and adjusts the operation rate of at least one of the plurality of loads from a power-rate change time when the next power rates are higher than the reference power rates.

4. The drying machine according to claim 3, wherein the controller adjusts the operation rate of at least one of the plurality of loads from a specific time earlier than the power-rate change time by a predetermined time.

5. The drying machine according to claim 1, wherein:
   the input unit receives a power saving rate from the user, and
   the controller adjusts the operation rate of at least one of the plurality of loads in response to the power saving rate.

6. The drying machine according to claim 1,
   wherein the storage unit stores load operation rates for each drying section while a drying process is performed at a point less than the reference power rates,
   wherein the controller controls the operation rates of the plurality of loads on the basis of the operation rate stored in the storage unit when the current power rates are less than the reference power rates.

7. The drying machine according to claim 6, wherein the heating drying section comprises a high temperature drying section, and a low temperature drying section.

8. A drying machine comprising:
   a drum including an object to be dried;
   a fan to circulate air within the drum;
   a plurality of loads comprising a motor to rotate the drum and the fan and a plurality of heaters to heat air provided to the drum;
   a communication unit to receive power rate information from an energy management system (EMS);
   an input unit to receive a drying process command from a user;
   a storage unit to store power consumption of each of the plurality of loads and store at least one load operated in each of the plurality of drying sections of the drying process; and a controller, upon receiving the drying process command, to recognize current power rates on the basis of power rate information, to determine whether the current power rates are higher than reference power rates, to recognize a current drying section from among several drying sections of the drying process when the current power rates are higher than the reference power rates, and to adjust an operation rate of a load having a highest power consumption from among the at least one load operated in the current drying section, wherein the current drying section comprises a heating drying section and a non-heating drying section.

9. The drying machine according to claim 8, wherein the plurality of heaters comprises a first heater and a second heater having different electric capacities.

10. The drying machine according to claim 9, wherein the controller determines whether power rates are changed in a drying process on the basis of the power rate information for each hour, recognizes the next power rates when the power rates are changed in the drying process, determines whether the next power rates are higher than the reference power rates by comparing the next power rates with the reference power rates, and adjusts the operation rate of any one of the plurality of loads from a power-rate change time when the next power rates are higher than the reference power rates.

11. The drying machine according to claim 10,
wherein the storage unit stores load operation rates for each drying section while the drying process is performed at a point less than the reference power rates,
wherein the controller controls the operation rates of each of the plurality of loads on the basis of the operation rate stored in the storage unit when the current power rates are less than the reference power rates.

12. The drying machine according to claim 11, wherein the heating drying section comprises a high temperature drying section for operating the first and second heaters, and a low temperature drying section for operating the second heater.

13. A drying machine comprising:
a drum including an object to be dried;
a fan to circulate air within the drum;
plurality of loads comprising a first motor to rotate the drum, a second motor to rotate the fan, and at least one heater to heat air provided to the drum;
a communication unit to receive power rate information from an energy management system (EMS);
an input unit to receive a drying process command from a user;
a storage unit to store power consumption of each of the plurality of loads and store at least one load operated in each of a plurality of drying sections of the drying process; and
a controller, upon receiving the drying process command, to recognize current power rates on the basis of power rate information, to determine whether the current power rates are higher than reference power rates, to recognize a current drying section from among several drying sections of the drying process when the current power rates are higher than the reference power rates, and to adjust an operation rate of a load having a highest power consumption from among the at least one load operated in the current drying section,
wherein the current drying section comprises a heating drying section and a non-heating drying section.

14. The drying machine according to claim 13, wherein the controller determines whether power rates are changed in a drying process on the basis of the power rate information for each hour, recognizes the next power rates when the power rates are changed in the drying process, determines whether the next power rates are higher than the reference power rates by comparing the next power rates with the reference power rates, and adjusts the operation rate of any one of the plurality of loads from a power-rate change time when the next power rates are higher than the reference power rates.

15. The drying machine according to claim 14,
wherein the controller recognizes a drying section to be activated at the power-rate change time, recognizes a load having highest power consumption from among at least one of the plurality of loads operated in the recognized drying section, and adjusts an operation rate of the recognized load.

16. The drying machine according to claim 13,
wherein the storage unit stores load operation rates for each drying section while a drying process is performed at a point less than the reference power rates,
wherein the controller controls the operation rates of the plurality of loads on the basis of the operation rate stored in the storage unit when the current power rates are less than the reference power rates.

17. The drying machine according to claim 13, wherein the controller, upon receiving a drying process command from the energy management system (EMS) through the communication unit, adjusts the operation rates of at least one of the plurality of loads on the basis of the received dry process command.

18. A method for controlling a drying machine which comprises a drum, a fan to circulate air within the drum, and a plurality of loads comprising a motor and at least one heater to heat air provided to the drum, the method comprising:
upon receiving a drying process command from a user, receiving power rate information for each hour from an energy management system (EMS);
recognizing current power rates on the basis of the power rate information;
determining whether the current power rates are higher than reference power rates; and
recognizing a current drying section from among several drying sections of the drying process when the current power rates are higher than the reference power rates, and
adjusting an operation rate of a load having a highest power consumption from among the at least one load operated in the current drying section,
wherein the current drying section comprises a heating drying section and a non-heating drying section.

19. The method according to claim 18, wherein the adjusting the operation rate of the load having the highest power consumption from among the plurality of drying sections comprises:
allowing the load to be operated at an operation rate corresponding to the current power rates.

20. The method according to claim 18, further comprising:
controlling operation rates of the plurality of loads on the basis of a predetermined operation rate when the current power rates are less than the reference power rates.

21. The method according to claim 20, further comprising:
recognizing an execution time of a drying process;
determining whether power rates are changed in the drying process execution time on the basis of power rate information for each hour;
if the power rates are changed in the drying process execution time, recognizing the next power rates and a power-rate change time; and
comparing the next power rates with reference power rates to determine whether the next power rates are higher than the reference power rates, and adjusting an operation rate of the plurality of loads from the power-rate change time when the next power rates are higher than the reference power rates.

22. The method according to claim 21, wherein the adjusting the operation rate of any one of the plurality of loads comprises:
recognizing a drying section to be activated at the power-rate change time;
recognizing a load having highest power consumption from among the plurality of loads operated in the recognized drying section; and
adjusting an operation rate of the recognized load.

23. The method according to claim 21, further comprising:
if the next power rates are equal to or less than the reference power rates, allowing each of the plurality of loads to be operated at a predetermined operation rate from the power-rate change time.

24. The method according to claim 21, wherein the adjusting the operation rate of the plurality of loads from the power-rate change time comprises:
adjusting the operation rate of any one of the plurality of loads from a specific time earlier than the power-rate change time by a predetermined time.

25. A method for controlling a drying machine which comprises a drum, a fan to circulate air within the drum, and a plurality of loads comprising a first motor to rotate the drum, a second motor to rotate the fan, and at least one heater to heat air provided to the drum, the method comprising:
upon receiving a drying process command from a user, recognizing a drying process execution time;
receiving power rate information from an energy management system (EMS);
recognizing current power rates on the basis of the power rate information;
determining whether the current power rates are higher than reference power rates;
recognizing a current drying section from among several drying sections of the drying process when the current power rates are higher than the reference power rates,
adjusting an operation rate of a load having a highest power consumption from among the at least one load operated in the current drying section,
wherein the current drying section comprises a heating drying section and a non-heating drying section.

26. The method according to claim 25, wherein the adjusting the operation rate of the load having the highest power consumption from among the plurality of drying sections comprises:
allowing the load having the highest power consumption to be operated at an operation rate corresponding to the current power rates.

27. The method according to claim 25, further comprising:
controlling operation rates of the plurality of loads on the basis of a predetermined operation rate when the current power rates are less than the reference power rates.

28. The method according to claim 27, further comprising:
recognizing an execution time of a drying process;
determining whether power rates are changed in the drying process execution time on the basis of power rate information for each hour;
if the power rates are changed in the drying process execution time, recognizing the next power rates and a power-rate change time; and
comparing the next power rates with reference power rates to determine whether the next power rates are higher than the reference power rates, and adjusting an operation rate of the plurality of loads from the power-rate change time when the next power rates are higher than the reference power rates.

29. The method according to claim 28, wherein the adjusting the operation rate of any one of the plurality of loads comprises:
recognizing a drying section to be activated at the power-rate change time;
recognizing a load having highest power consumption from among at least one of the plurality of loads operated in the recognized drying section; and
adjusting an operation rate of the recognized load.

30. The method according to claim 28, further comprising:
if the next power rates are equal to or less than the reference power rates, allowing each of the plurality of loads to be operated at a predetermined operation rate from the power-rate change time.

31. A method for controlling a dryer, the method comprising:
upon the dryer receiving a drying process command, receiving by a communication unit power rate information from an energy management system (EMS);
recognizing, by a controller, current power rates on the basis of the power rate information;
recognizing, by the controller, a current drying section from among several drying sections of a drying process when the current power rates are higher than reference power rates; and
adjusting, by the controller, an operation rate of a load having a highest power consumption from among the at least one load operated in the current drying section,
wherein the current drying section comprises a heating drying section and a non-heating drying section.

32. The method of claim 31, wherein the adjusting, by the controller, the operation rate of any one of the motor the at least one heater comprising adjusting the operation rate of any one of the motor and the at least one heater to reduce power consumed by the dryer.

33. A non-transitory, computer-readable medium storing a program instructing a computer to execute the method of claim 31.

* * * * *

UNITED STATES PATENT AND TRADEMARK OFFICE
CERTIFICATE OF CORRECTION

| | | |
|---|---|---|
| PATENT NO. | : 8,868,243 B2 | Page 1 of 1 |
| APPLICATION NO. | : 13/173747 | |
| DATED | : October 21, 2014 | |
| INVENTOR(S) | : Hyun Sook Kim et al. | |

It is certified that error appears in the above-identified patent and that said Letters Patent is hereby corrected as shown below:

In the Claims

Column 28, line 9, in Claim 1, delete "rates," and insert -- rates; --, therefor.

Signed and Sealed this
Second Day of June, 2015

Michelle K. Lee
*Director of the United States Patent and Trademark Office*